US010992253B2

(12) United States Patent
Atwater et al.

(10) Patent No.: US 10,992,253 B2
(45) Date of Patent: Apr. 27, 2021

(54) COMPACTABLE POWER GENERATION ARRAYS

(71) Applicant: California Institute of Technology, Pasadena, CA (US)

(72) Inventors: Harry A. Atwater, South Pasadena, CA (US); Sergio Pellegrino, Pasadena, CA (US); Seyed Ali Hajimiri, La Canada, CA (US); Emily C. Warmann, Riverside, CA (US); Dennis Callahan, Los Angeles, CA (US); Jeffrey P. Bosco, Los Angeles, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 15/233,739

(22) Filed: Aug. 10, 2016

(65) Prior Publication Data

US 2017/0047886 A1    Feb. 16, 2017

Related U.S. Application Data

(60) Provisional application No. 62/203,159, filed on Aug. 10, 2015, provisional application No. 62/220,017, (Continued)

(51) Int. Cl.
*H02S 40/22* (2014.01)
*H02S 30/20* (2014.01)

(52) U.S. Cl.
CPC .............. *H02S 40/22* (2014.12); *H02S 30/20* (2014.12); *Y02E 10/52* (2013.01)

(58) Field of Classification Search
CPC .......... F24S 23/70; F24S 23/71; F24S 23/715; F24S 23/72; F24S 23/74; F24S 23/746;
(Continued)

(56) References Cited

U.S. PATENT DOCUMENTS

| 2,599,944 A | 6/1952 | Salisbury et al. |
| 3,152,260 A | 10/1964 | Cummings |

(Continued)

FOREIGN PATENT DOCUMENTS

| CA | 2833826 A1 | 11/2012 |
| CA | 2833862 A1 | 5/2014 |

(Continued)

OTHER PUBLICATIONS

Extended European Search Report for European Application No. 15795587.3, Search completed Feb. 5, 2018, dated Feb. 12, 2018, 7 Pgs.
(Continued)

*Primary Examiner* — Eric R Smith
(74) *Attorney, Agent, or Firm* — KPPB LLP

(57) ABSTRACT

Compactable power generation arrays are provided. The compactable power generation arrays may include a structural substrate body having an array of solar concentrators configured to receive and re-direct solar radiation onto a plurality of photovoltaic (PV) cells. In many other embodiments the PV cells may be disposed upon a back surface of each of the solar concentrators such that an adjacent solar concentrator is configured to re-direct solar radiation onto the PV cell disposed on the back surface of the adjacent solar concentrator.

33 Claims, 18 Drawing Sheets

Related U.S. Application Data filed on Sep. 17, 2015, provisional application No. 62/239,706, filed on Oct. 9, 2015, provisional application No. 62/264,500, filed on Dec. 8, 2015, provisional application No. 62/268,632, filed on Dec. 17, 2015, provisional application No. 62/270,425, filed on Dec. 21, 2015, provisional application No. 62/294,859, filed on Feb. 12, 2016, provisional application No. 62/295,947, filed on Feb. 16, 2016, provisional application No. 62/320,819, filed on Apr. 11, 2016, provisional application No. 62/330,341, filed on May 2, 2016, provisional application No. 62/340,644, filed on May 24, 2016, provisional application No. 62/352,392, filed on Jun. 20, 2016, provisional application No. 62/366,720, filed on Jul. 26, 2016.

(58) Field of Classification Search
CPC .. F24S 23/75; F24S 23/77; F24S 23/79; F24S 23/80; F24S 23/81; F24S 23/82; F24S 23/83; F24S 2023/83–86; F24S 20/50; F24S 20/55; H01L 31/041; H01L 31/0488; H02S 40/20; H02S 40/22; H02S 30/20

See application file for complete search history.

(56) References Cited

U.S. PATENT DOCUMENTS

| | | |
|---|---|---|
| 3,419,433 A | 12/1968 | Slifer, Jr. |
| 3,427,200 A | 2/1969 | Lapin et al. |
| 3,433,677 A | 3/1969 | Robinson et al. |
| 3,437,527 A | 4/1969 | Webb |
| 3,457,427 A | 7/1969 | Tarneja et al. |
| 3,489,915 A | 1/1970 | Engelhardt et al. |
| 3,530,009 A | 9/1970 | Linkous et al. |
| 3,532,299 A | 10/1970 | Williamson et al. |
| 3,562,020 A | 2/1971 | Blevins |
| 3,611,652 A | 10/1971 | Rabenhorst et al. |
| 3,616,528 A | 11/1971 | Goldsmith et al. |
| 3,627,585 A | 12/1971 | Dollery et al. |
| 3,636,539 A | 1/1972 | Gaddy |
| 3,698,958 A | 10/1972 | Williamson et al. |
| 3,730,457 A | 5/1973 | Williams et al. |
| 3,735,943 A | 5/1973 | Fayet et al. |
| 3,758,051 A | 9/1973 | Williams |
| 3,781,647 A | 12/1973 | Glaser |
| 3,785,590 A | 1/1974 | Wentworth |
| 3,793,082 A | 2/1974 | Roger |
| 3,805,622 A | 4/1974 | Kinard |
| 3,809,337 A | 5/1974 | Andrews et al. |
| 3,817,477 A | 6/1974 | Luther et al. |
| 3,848,821 A | 11/1974 | Scheel |
| 3,863,870 A | 2/1975 | Andrews et al. |
| 3,952,324 A | 4/1976 | Wolff et al. |
| 3,989,994 A | 11/1976 | Brown |
| 4,078,747 A | 3/1978 | Minovitch |
| 4,116,258 A | 9/1978 | Slysh et al. |
| 4,133,501 A | 1/1979 | Pentlicki |
| 4,151,872 A | 5/1979 | Slysh et al. |
| 4,153,474 A | 5/1979 | Rex |
| 4,155,524 A | 5/1979 | Marello et al. |
| 4,166,919 A | 9/1979 | Carlson |
| 4,234,856 A | 11/1980 | Jung et al. |
| 4,282,394 A | 8/1981 | Lackey et al. |
| 4,328,389 A | 5/1982 | Stern et al. |
| 4,415,759 A | 11/1983 | Copeland et al. |
| 4,416,052 A | 11/1983 | Stern |
| 4,419,532 A | 12/1983 | Severns |
| 4,687,880 A | 8/1987 | Morris |
| 4,735,488 A | 4/1988 | Rancourt et al. |
| 4,780,726 A | 10/1988 | Archer et al. |
| 4,784,700 A | 11/1988 | Stern et al. |
| 4,789,989 A | 12/1988 | Stern et al. |
| 4,850,031 A | 7/1989 | Allsop et al. |
| 4,947,825 A | 8/1990 | Moriarty |
| 4,953,190 A | 8/1990 | Kukoleck et al. |
| 5,013,128 A | 5/1991 | Stern et al. |
| 5,114,101 A | 5/1992 | Stern et al. |
| 5,131,955 A | 7/1992 | Stern et al. |
| 5,154,777 A | 10/1992 | Blackmon et al. |
| 5,177,396 A | 1/1993 | Gielen et al. |
| 5,180,441 A | 1/1993 | Cornwall et al. |
| 5,226,107 A | 7/1993 | Stern et al. |
| 5,280,441 A | 1/1994 | Wada et al. |
| 5,309,925 A | 5/1994 | Policastro |
| 5,310,141 A | 5/1994 | Homer et al. |
| 5,337,980 A | 8/1994 | Homer et al. |
| 5,344,496 A | 9/1994 | Stern et al. |
| 5,404,868 A | 4/1995 | Sankrithi |
| 5,428,483 A * | 6/1995 | Sato ............... B29D 11/00596 359/838 |
| 5,487,791 A | 1/1996 | Everman et al. |
| 5,496,414 A | 3/1996 | Harvey et al. |
| 5,502,451 A | 3/1996 | Rainville et al. |
| 5,512,913 A | 4/1996 | Staney |
| 5,520,747 A | 5/1996 | Marks |
| 5,569,332 A | 10/1996 | Glatfelter et al. |
| 5,623,119 A | 4/1997 | Yater et al. |
| 5,653,222 A | 8/1997 | Newman |
| 5,666,127 A | 9/1997 | Kochiyama et al. |
| 5,785,280 A * | 7/1998 | Baghdasarian ........ B64G 1/222 136/245 |
| 5,885,367 A | 3/1999 | Brown et al. |
| 5,909,299 A | 6/1999 | Sheldon, Jr. et al. |
| 5,909,860 A | 6/1999 | Lee et al. |
| 5,969,695 A | 10/1999 | Bassily et al. |
| 5,984,484 A | 11/1999 | Kruer |
| 6,017,002 A | 1/2000 | Burke et al. |
| 6,031,178 A * | 2/2000 | Kester ................... B64G 1/222 136/245 |
| 6,043,425 A | 3/2000 | Assad |
| 6,050,526 A | 4/2000 | Stribling |
| 6,060,790 A | 5/2000 | Craig, Jr. |
| 6,091,017 A | 7/2000 | Stern |
| 6,118,067 A * | 9/2000 | Lashley ................ B64G 1/443 136/245 |
| 6,150,995 A | 11/2000 | Gilger |
| 6,188,012 B1 | 2/2001 | Ralph |
| 6,194,790 B1 | 2/2001 | Griffin et al. |
| 6,195,067 B1 | 2/2001 | Gilger |
| 6,284,967 B1 | 9/2001 | Hakan et al. |
| 6,300,558 B1 | 10/2001 | Takamoto et al. |
| 6,343,442 B1 | 2/2002 | Marks |
| 6,366,255 B1 | 4/2002 | Chiang |
| 6,366,256 B1 | 4/2002 | Ramanujam et al. |
| 6,369,545 B1 | 4/2002 | Williams et al. |
| 6,394,395 B1 | 5/2002 | Poturalski et al. |
| 6,423,895 B1 | 7/2002 | Murphy et al. |
| 6,429,368 B1 | 8/2002 | Summers |
| 6,528,716 B2 | 3/2003 | Collette et al. |
| 6,534,705 B2 | 3/2003 | Berrios et al. |
| 6,541,916 B2 | 4/2003 | Decker |
| 6,547,190 B1 | 4/2003 | Thompson et al. |
| 6,555,740 B2 | 4/2003 | Roth et al. |
| 6,557,804 B1 | 5/2003 | Carroll |
| 6,560,942 B2 | 5/2003 | Warren et al. |
| 6,565,044 B1 | 5/2003 | Johnson et al. |
| 6,577,130 B1 | 6/2003 | Adamo et al. |
| 6,587,263 B1 | 7/2003 | Iacovangelo et al. |
| 6,590,150 B1 | 7/2003 | Kiefer |
| 6,635,507 B1 | 10/2003 | Boutros et al. |
| 6,655,638 B2 | 12/2003 | Deel |
| 6,660,927 B2 | 12/2003 | Zwanenburg |
| 6,660,928 B1 | 12/2003 | Patton et al. |
| 6,689,952 B2 | 2/2004 | Kawaguchi |
| 6,690,252 B2 | 2/2004 | Scoltock, Jr. et al. |
| 6,713,670 B2 | 3/2004 | Stern et al. |
| 6,735,838 B1 | 5/2004 | Triller et al. |
| 6,735,920 B1 | 5/2004 | Cadogan |
| 6,768,048 B2 | 7/2004 | Woll et al. |
| 6,784,359 B2 | 8/2004 | Clark et al. |
| 6,799,742 B2 | 10/2004 | Nakamura et al. |

(56) References Cited

U.S. PATENT DOCUMENTS

| | | | |
|---|---|---|---|
| 6,882,072 B2 | 4/2005 | Wingett et al. | |
| 6,897,730 B2 | 5/2005 | Dupuis et al. | |
| 6,903,261 B2 | 6/2005 | Habraken et al. | |
| 6,904,749 B2 | 6/2005 | Joshi et al. | |
| 6,909,042 B2 | 6/2005 | Geyer et al. | |
| 6,936,760 B2 | 8/2005 | Spirnak et al. | |
| 6,983,914 B2 | 1/2006 | Stribling et al. | |
| 7,006,039 B2 | 2/2006 | Miyamoto et al. | |
| 7,053,294 B2 | 5/2006 | Tuttle et al. | |
| 7,077,361 B1 | 7/2006 | Rabinowitz | |
| 7,138,960 B2 | 11/2006 | Carroll et al. | |
| 7,163,179 B1 | 1/2007 | Taylor | |
| 7,211,722 B1 | 5/2007 | Murphy | |
| 7,271,333 B2 | 9/2007 | Fabick et al. | |
| 7,301,095 B2 | 11/2007 | Murphy et al. | |
| 7,303,166 B2 | 12/2007 | Geery | |
| 7,319,189 B2 | 1/2008 | Ruelle et al. | |
| 7,354,033 B1 * | 4/2008 | Murphey | B64G 1/222 267/151 |
| 7,392,011 B1 | 6/2008 | Jacomb-Hood | |
| 7,464,895 B2 | 12/2008 | Palmer | |
| 7,474,249 B1 | 1/2009 | Williams et al. | |
| 7,486,431 B2 | 2/2009 | Rabinowitz | |
| 7,564,149 B2 | 7/2009 | Siri et al. | |
| 7,564,628 B2 | 7/2009 | Barth et al. | |
| 7,568,479 B2 | 8/2009 | Rabinowitz | |
| 7,612,284 B2 | 11/2009 | Rogers et al. | |
| 7,736,007 B2 | 6/2010 | Rabinowitz | |
| 7,866,836 B2 | 1/2011 | Rabinowitz | |
| 7,878,667 B2 | 2/2011 | Rabinowitz | |
| 7,895,795 B1 | 3/2011 | Murphey et al. | |
| 7,960,641 B2 | 6/2011 | Rabinowitz | |
| 8,071,873 B2 | 12/2011 | Rabinowitz | |
| 8,146,867 B2 | 4/2012 | Jordan et al. | |
| 8,215,298 B2 | 7/2012 | Klotz | |
| 8,308,111 B2 | 11/2012 | Lu et al. | |
| 8,432,224 B1 | 4/2013 | Woo et al. | |
| 8,439,511 B2 | 5/2013 | Stern et al. | |
| 8,616,502 B1 | 12/2013 | Stribling et al. | |
| 8,636,253 B1 * | 1/2014 | Spence | B64G 1/222 244/172.8 |
| 8,683,755 B1 | 4/2014 | Spence et al. | |
| 8,872,018 B1 | 10/2014 | Breen et al. | |
| 9,004,410 B1 * | 4/2015 | Steele | B64G 1/443 244/172.7 |
| 9,079,673 B1 | 7/2015 | Steele et al. | |
| 9,120,583 B1 | 9/2015 | Spence et al. | |
| 9,156,568 B1 | 10/2015 | Spence et al. | |
| 9,248,922 B1 | 2/2016 | Baghdasarian et al. | |
| 9,276,148 B2 | 3/2016 | Jaffe et al. | |
| 9,346,566 B2 | 5/2016 | Spence et al. | |
| 9,444,394 B1 * | 9/2016 | Thomas | H02S 20/30 |
| 9,709,349 B2 | 7/2017 | Raman et al. | |
| 10,144,533 B2 | 12/2018 | Atwater et al. | |
| 10,340,698 B2 | 7/2019 | Pellegrino et al. | |
| 10,454,565 B2 | 10/2019 | Pellegrino et al. | |
| 10,696,428 B2 | 6/2020 | Pellegrino et al. | |
| 10,749,593 B2 | 8/2020 | Hajimiri et al. | |
| 2002/0007845 A1 | 1/2002 | Collette et al. | |
| 2002/0029796 A1 | 3/2002 | Mikami et al. | |
| 2002/0029797 A1 | 3/2002 | Mikami et al. | |
| 2002/0032992 A1 | 3/2002 | Roth et al. | |
| 2002/0134423 A1 | 9/2002 | Eller et al. | |
| 2003/0098057 A1 | 5/2003 | Mizuno et al. | |
| 2003/0098058 A1 | 5/2003 | Takada et al. | |
| 2003/0192586 A1 | 10/2003 | Takada et al. | |
| 2003/0196298 A1 | 10/2003 | Hinkley et al. | |
| 2004/0011395 A1 | 1/2004 | Nicoletti et al. | |
| 2004/0140930 A1 | 7/2004 | Harles | |
| 2004/0187912 A1 | 9/2004 | Takamoto et al. | |
| 2004/0231718 A1 | 11/2004 | Umeno et al. | |
| 2005/0046977 A1 | 3/2005 | Shifman | |
| 2005/0178921 A1 | 8/2005 | Stribling et al. | |
| 2005/0241691 A1 | 11/2005 | Wakefield | |
| 2005/0257823 A1 | 11/2005 | Zwanenburg | |
| 2006/0038083 A1 | 2/2006 | Criswell | |
| 2006/0109053 A1 | 5/2006 | Kim et al. | |
| 2006/0157103 A1 | 7/2006 | Sheats et al. | |
| 2006/0186274 A1 | 8/2006 | Wang et al. | |
| 2006/0234694 A1 | 10/2006 | Kawasaki et al. | |
| 2007/0029446 A1 | 2/2007 | Mosher et al. | |
| 2007/0087704 A1 | 4/2007 | Gilberton | |
| 2008/0000232 A1 | 1/2008 | Rogers et al. | |
| 2008/0055177 A1 | 3/2008 | Dixon | |
| 2008/0088409 A1 | 4/2008 | Okada | |
| 2008/0149162 A1 | 6/2008 | Martinelli et al. | |
| 2008/0173349 A1 | 7/2008 | Liu et al. | |
| 2008/0185039 A1 | 8/2008 | Chan | |
| 2008/0251113 A1 | 10/2008 | Horne et al. | |
| 2008/0283109 A1 | 11/2008 | Mankins et al. | |
| 2009/0126792 A1 | 5/2009 | Gruhlke et al. | |
| 2009/0133738 A1 | 5/2009 | Shiao et al. | |
| 2009/0151769 A1 | 6/2009 | Corbin | |
| 2009/0199893 A1 | 8/2009 | Bita et al. | |
| 2009/0223554 A1 | 9/2009 | Sharps | |
| 2009/0250094 A1 | 10/2009 | Robison et al. | |
| 2009/0301544 A1 | 12/2009 | Minelli | |
| 2009/0308451 A1 | 12/2009 | Oesterle et al. | |
| 2010/0170560 A1 | 7/2010 | Sapienza et al. | |
| 2010/0180946 A1 | 7/2010 | Gruhlke et al. | |
| 2010/0224231 A1 | 9/2010 | Hoke | |
| 2010/0263709 A1 | 10/2010 | Norman et al. | |
| 2010/0269885 A1 | 10/2010 | Benitez et al. | |
| 2010/0276547 A1 | 11/2010 | Rubenchik et al. | |
| 2010/0289342 A1 | 11/2010 | Maness | |
| 2010/0300507 A1 | 12/2010 | Heng et al. | |
| 2010/0319774 A1 | 12/2010 | Schwartz | |
| 2011/0041894 A1 * | 2/2011 | Liao | H01L 31/052 136/246 |
| 2011/0049992 A1 | 3/2011 | Sant'Anselmo et al. | |
| 2011/0061718 A1 | 3/2011 | Fork et al. | |
| 2011/0080135 A1 | 4/2011 | Bland | |
| 2011/0100425 A1 | 5/2011 | Osamura et al. | |
| 2011/0120524 A1 | 5/2011 | Wares et al. | |
| 2011/0122016 A1 | 5/2011 | Lomes et al. | |
| 2011/0203574 A1 | 8/2011 | Harding | |
| 2011/0210209 A1 | 9/2011 | Taylor et al. | |
| 2011/0232718 A1 * | 9/2011 | Nawab | H01L 31/0547 136/246 |
| 2011/0300664 A1 | 12/2011 | Chung et al. | |
| 2011/0315192 A1 | 12/2011 | Swatek et al. | |
| 2012/0019942 A1 | 1/2012 | Morgan et al. | |
| 2012/0024362 A1 | 2/2012 | Gossman | |
| 2012/0031393 A1 | 2/2012 | Linderman et al. | |
| 2012/0125415 A1 | 5/2012 | Tischler | |
| 2012/0138749 A1 | 6/2012 | Ellinghaus | |
| 2012/0138997 A1 | 6/2012 | Tasaki et al. | |
| 2012/0160299 A1 | 6/2012 | Reid et al. | |
| 2012/0243252 A1 | 9/2012 | Kim | |
| 2013/0009851 A1 | 1/2013 | Danesh | |
| 2013/0032673 A1 | 2/2013 | Kobayashi | |
| 2013/0093287 A1 | 4/2013 | Biso et al. | |
| 2013/0099599 A1 | 4/2013 | Jaffe et al. | |
| 2013/0133730 A1 | 5/2013 | Pan et al. | |
| 2013/0220399 A1 | 8/2013 | Gruhlke et al. | |
| 2013/0233974 A1 | 9/2013 | Maiboroda et al. | |
| 2013/0234645 A1 | 9/2013 | Goei et al. | |
| 2013/0319504 A1 | 12/2013 | Yang et al. | |
| 2013/0319505 A1 | 12/2013 | Yang et al. | |
| 2013/0332093 A1 | 12/2013 | Adest et al. | |
| 2014/0041705 A1 | 2/2014 | Kang et al. | |
| 2014/0083479 A1 | 3/2014 | Takayama et al. | |
| 2014/0102686 A1 | 4/2014 | Yu et al. | |
| 2014/0131023 A1 | 5/2014 | Raman et al. | |
| 2014/0148197 A1 | 5/2014 | Shields | |
| 2014/0150865 A1 | 6/2014 | Kwon et al. | |
| 2014/0158197 A1 | 6/2014 | Rubenstein et al. | |
| 2014/0159636 A1 | 6/2014 | Yang et al. | |
| 2014/0261621 A1 | 9/2014 | Gruhlke et al. | |
| 2014/0261622 A1 | 9/2014 | Floyd et al. | |
| 2014/0263844 A1 | 9/2014 | Cook, Jr. et al. | |
| 2014/0263847 A1 | 9/2014 | Eskenazi et al. | |
| 2014/0326833 A1 | 11/2014 | Spence et al. | |

(56) References Cited

U.S. PATENT DOCUMENTS

| | | | |
|---|---|---|---|
| 2014/0356613 A1* | 12/2014 | Weisenberger | C09K 5/14 428/300.7 |
| 2015/0022909 A1 | 1/2015 | O'Neill | |
| 2015/0053253 A1 | 2/2015 | O'Neill | |
| 2015/0130293 A1 | 5/2015 | Hajimiri et al. | |
| 2015/0144740 A1 | 5/2015 | Turse et al. | |
| 2015/0155413 A1 | 6/2015 | Pokharna et al. | |
| 2015/0217876 A1 | 8/2015 | Halsband | |
| 2015/0244304 A1 | 8/2015 | Ozeki et al. | |
| 2016/0056321 A1 | 2/2016 | Atwater et al. | |
| 2016/0065006 A1 | 3/2016 | Woods | |
| 2016/0122041 A1 | 5/2016 | Abrams et al. | |
| 2016/0164451 A1 | 6/2016 | McEnaney et al. | |
| 2016/0376037 A1 | 12/2016 | Pellegrino et al. | |
| 2016/0380486 A1 | 12/2016 | Hajimiri et al. | |
| 2016/0380580 A1 | 12/2016 | Atwater et al. | |
| 2017/0021947 A1 | 1/2017 | Pellegrino et al. | |
| 2017/0025992 A1 | 1/2017 | Atwater et al. | |
| 2017/0047463 A1 | 2/2017 | Hajimiri et al. | |
| 2017/0047889 A1 | 2/2017 | Atwater et al. | |
| 2017/0047987 A1 | 2/2017 | Pellegrino et al. | |
| 2017/0063296 A1* | 3/2017 | Cruijssen | H02S 40/22 |
| 2018/0315877 A1 | 11/2018 | Kelzenberg et al. | |
| 2020/0024007 A1 | 1/2020 | Pellegrino et al. | |

FOREIGN PATENT DOCUMENTS

| | | | |
|---|---|---|---|
| CN | 104158471 A | 11/2014 | |
| EP | 0541052 A1 | 5/1993 | |
| EP | 0977273 A1 | 2/2000 | |
| EP | 977273 A1 | 2/2000 | |
| EP | 0996170 A2 | 4/2000 | |
| EP | 1501132 A2 | 1/2005 | |
| EP | 976655 B1 | 9/2005 | |
| EP | 1852919 A2 | 11/2007 | |
| EP | 1852919 A3 | 2/2009 | |
| EP | 2318045 A1 | 5/2011 | |
| EP | 3149777 A1 | 4/2017 | |
| EP | 3325347 A1 | 5/2018 | |
| EP | 3334655 A1 | 6/2018 | |
| FR | 2956774 A1 | 8/2011 | |
| GB | 2247564 A * | 3/1992 | B64G 1/443 |
| JP | 6298781 A | 5/1987 | |
| JP | 63254772 A | 10/1988 | |
| JP | 0369258 U | 7/1991 | |
| JP | 05107328 A | 4/1993 | |
| JP | 06253477 A | 9/1994 | |
| JP | H06327173 A | 11/1994 | |
| JP | 082500 A | 9/1996 | |
| JP | 2000114571 A | 4/2000 | |
| JP | 2001088799 A | 4/2001 | |
| JP | 2001309581 A | 11/2001 | |
| JP | 2002095189 A | 3/2002 | |
| JP | 2002362500 A | 12/2002 | |
| JP | 2003164077 A | 6/2003 | |
| JP | 2003164078 A | 6/2003 | |
| JP | 2003191899 A | 7/2003 | |
| JP | 2004090817 A | 3/2004 | |
| JP | 2004196051 A | 7/2004 | |
| JP | 2004253471 A | 9/2004 | |
| JP | 2004296658 A | 10/2004 | |
| JP | 2009184603 A | 8/2009 | |
| JP | 2010259301 A | 11/2010 | |
| JP | 6640116 B2 | 1/2020 | |
| JP | 6693889 B2 | 4/2020 | |
| JP | 6715317 B2 | 6/2020 | |
| WO | 2004049538 A2 | 6/2004 | |
| WO | 2008073905 A2 | 6/2008 | |
| WO | 2009124098 A2 | 10/2009 | |
| WO | 2010033632 A2 | 3/2010 | |
| WO | 2011006506 A1 | 1/2011 | |
| WO | 2011062785 A2 | 5/2011 | |
| WO | 2011067772 A1 | 6/2011 | |
| WO | 2011109275 A1 | 9/2011 | |
| WO | 2011062785 A3 | 11/2011 | |
| WO | 2015175839 | 11/2015 | |
| WO | 2015179213 A2 | 11/2015 | |
| WO | 2015179214 A2 | 11/2015 | |
| WO | WO-2015175839 A1 * | 11/2015 | |
| WO | 2015187221 A2 | 12/2015 | |
| WO | 2015187739 | 12/2015 | |
| WO | 2017015508 | 1/2017 | |
| WO | 2017015605 | 1/2017 | |
| WO | 2017027615 | 2/2017 | |
| WO | 2017027617 | 2/2017 | |
| WO | 2017027629 | 2/2017 | |
| WO | 2017027633 | 2/2017 | |

OTHER PUBLICATIONS

International Preliminary Report on Patentability for International Application PCT/US2016/043424, Report completed Dec. 2, 2017, dated Dec. 15, 2017, 153 Pgs.
International Preliminary Report on Patentability for International Application PCT/US2016/043677, Report dated Jan. 23, 2018, dated Feb. 1, 2018, 6 Pgs.
International Preliminary Report on Patentability for International Application PCT/US2016/046389, Report dated Feb. 13, 2018, dated Feb. 22, 2018, 9 Pgs.
International Preliminary Report on Patentability for International Application PCT/US2016/046394, Report dated Feb. 13, 2018, dated Feb. 22, 2018, 10 Pgs.
International Preliminary Report on Patentability for International Application PCT/US2016/046415, Report dated Feb. 13, 2018, dated Feb. 22, 2018, 8 Pgs.
International Preliminary Report on Patentability for International Application PCT/US2016/046421, Report dated Feb. 13, 2018, dated Feb. 22, 2018, 8 Pgs.
Radford et al., "Measurement of Manufacturing Distortion in Flat Composite Laminates", International Conference on Composite Materials, Jul. 1999, 9 pgs.
Vaccaro et al., "In-flight experiment for combined planar antennas and solar cells (SOLANT)", IET Microwaves Antennas & Propaga, vol. 3, No. 8, Dec. 1, 2009, pp. 1279-1287.
ATI Industrial, Multi-Axis Force / Torque Sensor, ATI Industrial Automation, Jul. 23, 2014, pp. 1-44.
DuPont Kapton, Mar. 2012, 26 pgs.
Extended European Search Report for European Application No. 15803447.0, Search completed Oct. 17, 2017, dated Oct. 25, 2017, 10 Pgs.
Smooth on, Mold Max® XLS® II, Jan. 15, 2016, 2 pgs.
"AZ Technology | Materials, Paint and Coatings: AZ-93 White Thermal Control, Electrically Conductive Paint / Coating (AZ's Z-93P)", Available http://www.aztechnology.com/materials-coatings-az-93.html, Accessed: Dec. 19, 2016, 2 pgs.
"Corona Resistant Kapton CR Takes Electrical Insulation Design and Reliability to New Levels", Kapton, DuPont Films, H-54506-1.
"DuPont Kapton 100CRC: Technical Data Sheet", kapton.dupont.com, Jul. 2014, K-28402.
"DuPont Kapton 120FWN616B", kapton.dupont.com, K-28459, Sep. 2014.
"DuPont Kapton 150FCRC019", kapton.dupont.com, K-28402, Jun. 2014.
"DuPont Kapton 150FWN019: Magnet Wire Insulation", www.kapton.dupont.com, H-78319-01, Mar. 2005.
"DuPont Kapton 150FWR019: Insulation Substrate", www.dupont.com/kapton, H-78312, Nov. 2001.
"DuPont Kapton 150PRN411", kapton.com, K-28731, Dec. 2014.
"DuPont Kapton 200FWR919: Insulation Substrate", www.dupont.com/kapton, H-78313, Nov. 2001.
"DuPont Kapton 200RS100", kapton.com, K-15354-2, Sep. 2014.
"DuPont Kapton B: Technical Bulletin", kapton.dupont.com, K-25099-1, Jul. 2013.
"DuPont Kapton FCR: Advanced Magnet Wire Insulation", Jun. 2005, H-99888.
"DuPont Kapton FN: Polyimide Film", kapton.com, K-15347-2, Jun. 2015.

(56) References Cited

OTHER PUBLICATIONS

"DuPont Kapton FPC: Polyimide Film", kapton.dupont.com, K-15361, Mar. 2006.
"DuPont Kapton GS Polyimide Film: Technical Data Sheet", kapton.dupont.com, K-26875-1, Jul. 2014.
"DuPont Kapton HN: Polyimide Film", kapton.dupont.com, K-15345-1, Apr. 2011.
"DuPont Kapton HPP-ST: Polyimide Film", kapton.dupont.com, K-15357, Mar. 2006.
"DuPont Kapton MT: Technical Data Sheet", kapton.dupont.com, H-38497-3, Apr. 2014.
"DuPont Kapton PST: Polyimide Film", kapton.dupont.com, K-10790, Nov. 2005.
"DuPont Kapton PV9100 Series: Polyimide Films", kapton.dupont.com, K-26028-1_A4, Oct. 2012.
"DuPont Kapton: Polyimide Film", kapton.dupont.com, Mar. 2012, H-38479-9, 7 pgs.
"ESA. Composite material structures.", printed Jun. 29, 2017 from http://www.esa.int/Our_Activities/Space_Engineering_Technology/Structures/Composite_Materials_structures, Oct. 20, 2014, 2 pgs.
"Orbital ATK", Coilable Boom Systems. Technical report, Oct 18, 1989, 2 pgs.
"Space solar power limitless clean energy from space", National Space Society, printed Jun. 29, 2017 from http://www.nss.org/settlement/ssp/, May 2017, 11 pgs.
Aguirre-Martinez et al., "Development of a Continuous Manufacturing Method for a Deployable Satellite Mast in Cfrp", 15th Reinforced Plastics Congress 1986., (September), pp. 107-110, 1986.
Aieta et al., "Aberration-Free Ultrathin Flat Lenses and Axicons at Telecom Wavelengths Based on Plasmonic Metasurfaces", Nano Lett., Web publication date Aug. 2, 2012, vol. 12, No. 9, pp. 4932-4936.
Amacher et al., "Thin ply composites: Experimental characterization and modeling of size-effects", Composites Science and Technology, Jul. 11, 2014, vol. 101, pp. 121-132.
Andryieuski et al., "Rough metal and dielectric layers make an even better hyperbolic metamaterial absorber", Optics Express, Jun. 11, 2014, vol. 22, No. 12, pp. 14975-14980.
Arai, "Pitch-based carbon fiber with low modulus and high heat conduction", Nippon Steel Technical Report No. 84, Jul. 11, 2001, pp. 12-17.
Arbabi, et al., "Multiwavelength polarization insensitive lenses based on dielectric metasurfaces with meta-molecules", Optics, Jan. 22, 2016, vol. 3, Issue 6, pp. 628-633.
Arbabi, et al., "Subwavelength-thick lenses with high numerical apertures and large efficiency based on high-contrast transmitarrays", Nature Communications, May 5, 2015, vol. 6, pp. 7069, doi:10.1038/ncomms8069.
Arbabi et al., "Dielectric Metasurfaces for Complete Control of Phase and Polarization with Subwavelength Spatial Resolution and High Transmission", Nature Nanotechnology, Aug. 31, 2015, 27 pgs., doi:10.1038/nnano.2015.186.
International Preliminary Report on Patentability for International Application PCT/US2016/043424, Report dated May 15, 2018, dated May 24, 2018, 12 Pgs.
Arya, "Packaging and Deployment of Large Planar Spacecraft Structures", Thesis of Manan Arya, May 2, 2016, 131 pgs.
Arya et al., "Ultralight Structures for Space Solar Power Satellites", American Institute of Aeronautics and Astronautics, 2016, pp. 1-18.
Banik et al., "Performance Validation of the Triangular Rollable and Collapsible Mast", Proceedings of the 24th Annual AIAA/USU Conference on Small Satellites, Logan, UT, Aug. 9, 2010, 8 pgs.
Bapanapalli et al., "The Effect of Tool-Part Interactions on the Geometry of Laminated Composites", Washington State University, Jul. 10, 2016.
Biddy et al., "LightSail-1 solar sail design and qualification", Proceedings of the 41st Aerospace Mechanisms Symposium, May 16, 2012, pp. 451-463.

Cahill et al., "Nanoscale thermal transport. II. 2003-2012", Applied Physics Review, Jan. 14, 2014, vol. 1, No. 1, pp. 011305-1-011305-45.
Calladine et al., "The theory of thin shell structures 1888-1988", Proceedings of the Institution of Mechanical Engineers, Part A: Journal of Power and Energy, vol. 202, No. 3, Jan. 7, 1988, pp. 141-149.
Castle Jr., "Heat conduction in carbon materials", 1st Biennial Conference of the American Carbon Society, pp. 13-19, Nov. 2, 1953.
Chen et al., "Planar Heterojunction Perovskite Solar Cells via Vapor-Assisted Solution Process", Journal of the American Chemical Society 136, Dec. 20, 2013, pp. 622-625.
Cheng et al., "Optical metasurfaces for beam scanning in space", Optics Letters, May 1, 2014, vol. 39, No. 9, pp. 2719-2722.
David, "Extraterrestrial mining could reap riches and spur exploration", http://www.space.com/16273-extraterrestrial-mining-asteroids-moon.html, Jun. 25, 2012, 7 pgs.
Du Toit et al., "Advances in the design of Jaumann absorbers", in Antennas and Propagation Society International Symposium, 1990. AP-S. Merging Technologies for the 90's. Digest., May 7, 1990, vol. 3, pp. 1212-1215.
Elfiky et al., "Study the effects of proton irradiation on GaAs/Ge solar cells", 35th IEEE Photovoltaic Specialist Conference, Jul. 2010, pp. 002528-002532.
Emerson, "Electromagnetic wave absorbers and anechoic chambers through the years", IEEE Trans. Antennas Propag., vol. 21, No. 4, Jul. 1973, pp. 484-490.
Eperon et al., "Morphological Control for High Performance, Solution-Processed Planar Heterojunction Perovskite Solar Cells", Advanced Functional Materials 24, first published Sep. 9, 2013, pp. 151-157.
Ersoy et al., "An experimental method to study the frictional processes during composites manufacturing", Composites Part A: Applied Science and Manufacturing, Feb. 19, 2005, vol. 36, No. 11, pp. 1536-1544.
Estvanko et al., "Numerical analysis of a tape spring hinge folded about two axes", Earth and Space 2012 © Engineering, Science, Construction, and Operations in Challenging Environments, ASCE, Jul. 11, 2012, pp. 714-721.
Fallahi et al., "Thin wideband radar absorbers", Transactions on Antennas and Propagation, Nov. 30, 2010, vol. 58, No. 12, pp. 4051-4058.
Fante et al., "Reflection properties of the Salisbury screen", IEEE Transactions on Antennas and Propagation, Oct. 1988, vol. 36, No. 10, pp. 1443-1454.
Fernandez, "Advanced Deployable Shell-Based Composite Booms for Small Satellite Structural Applications Including Solar Sails", International Symposium on Solar Sailing, Jan. 17-20, 2017, Kyoto, Japan, 19 pgs.
Fernlund, "Experimental and numerical study of the effect of cure cycle, tool surface, geometry, and lay-up on the dimensional fidelity of autoclave-processed composite parts", Composites—Part A: Applied Science and Manufacturing, 33(3):341-351, 2002.
Herbeck et al., "Development and test of deployable ultra-lightweight CFRP-booms for a Solar Sail", European Space Agency, (Special Publication) ESA SP, 49(468):107-112, 2001.
Hillebrandt et al., "The Boom Design of the De-Orbit Sail Satellite", European Conference on Spacecraft Structures, Materials and Mechanical Testing, European Conference on Spacecraft Structures, Materials & Environmental Testing, Apr. 1-4, 2014, Braunschweig, Germany., 8 pgs.
Huang et al., "Gate-tunable conducting oxide metasurfaces", Nano Letters, vol. 16, No. 9., web publication date Aug. 26, 2016, pp. 5319-5325.
Irwin et al., "Low-Mass Deployable Spacecraft Booms", AIAA Space 2010 Conference & Exposition, pp. 1-11, Aug. 30, 2010.
Jang et al., "Tunable large resonant absorption in a midinfrared graphene Salisbury screen", Physical Review. B, Oct. 8, 2014, vol. 90, No. 16, pp. 165409-1-165409-5.
Kelly, "On Kirchhoff's law and its generalized application to absorption and emission by cavities", Journal of Research of the National Bureau of Standards—B. Mathematics and Mathematical Physics, Jul.-Sep. 1965, vol. 69B, No. 3, pp. 165-171.

(56) References Cited

OTHER PUBLICATIONS

Kildishev et al., "Planar Photonics with Metasurfaces", Science, Mar. 15, 2013, vol. 339, No. 6125, pp. 1232009-1-1232009-6.
Knott et al., "Performance Degradation of Jaumann Absorbers Due to Curvature", IEEE Transactions on Antennas and Propagation, Jan. 1980, vol. AP28, No. 1, pp. 137-139.
Kryder et al., "Heat Assisted Magnetic Recording", Proceeding of the IEEE, current version published Dec. 2, 2008, vol. 96, No. 11, pp. 1810-1835.
Leclerc et al., "Characterization of Ultra-Thin Composite Triangular Rollable and Collapsible Booms", 4th AIAA Spacecraft Structures Conference, AIAA SciTech Forum, Jan. 2017, 15 pgs.
Lee et al., "Non-Destructive Wafer Recycling for Low-Cost Thin-Film Flexible Optoelectronics", Advanced Functional Materials, Apr. 2, 2014, vol. 24, pp. 4284-4291.
Liang et al., "Additive Enhanced Crystallization of Solution-Processed Perovskite for Highly Efficient Planar-Heterojunction Solar Cells", Advanced Materials, Mar. 14, 2014, vol. 26, pp. 3748-3754.
Liu et al., "Microstructure, thermal shock resistance and thermal emissivity of plasma sprayed $LaMAl11\ O19(M=Mg,\ Fe)$ coatings for metallic thermal protection systems", Applied Surface Science, vol. 271, Feb. 6, 2013, pp. 52-59.
Luukkonen et al., "A thin electromagnetic absorber for wide incidence angles and both polarizations", IEEE Transactions on Antennas and Propagation, IEEE Transactions on Antennas and Propagation Jul. 28, 2009, pp. 3119-3125.
Mankins, "A technical overview of the "SunTower" solar power satellite concept", Acta Astronautica, 50(6):369-377, Mar. 1, 2002.
Messenger et al., "Quantifying low energy proton damage in multijunction solar cell", in the proceedings of the 19th Space photovoltaic research and technology conference, 2005, NASA/CP-2007-214494, pp. 8-17.
Miyazawa et al., "Evaluation of radiation tolerance of perovskite solar cell for use in space", Photovoltaic Specialist Conference (PVSC), 2015 IEEE 42nd, New Orleans, LA, USA, Dec. 17, 2015, pp. 1-4, published Jun. 1, 2015.
Mizuno et al., "A black body absorber from vertically aligned single-walled carbon nanotubes", Proc. Natl. Acad. Sci., Apr. 14, 2009, vol. 106, No. 15, pp. 6044-6047.
Narimanov et al., "Reduced reflection from roughened hyperbolic metamaterial", Optics Express, Jun. 17, 2013, vol. 21, No. 12, pp. 14956-14961.
Ni et al., "Metasurface holograms for visible light", Nature Communications, Nov. 15, 2013, vol. 4, pp. 1-6.
NTPT, "NTPT Thin prepreg 402", Data sheet, Version 1.6, May 11, 2017, 5 pgs.
O'Hara, "Mechanical properties of silicone rubber in a closed volume", Technical Report, Army Armament Research and Development Center, Dec. 1983, 21 pgs.
Pellegrino, "AAReST telescope architecture", obtained from http://www.pellegrino.caltech.edu/aarest2/, printed Jul. 5, 2017, 4 pgs.
Penjuri, et al., "Simulation and Testing of Deployable CFRP Booms for Large Space Structures", PhD thesis, Aug. 2011, 118 pgs.
Pors et al., "Analog Computing Using Reflective Plasmonic Metasurfaces", Nano Lett., Dec. 18, 2014, vol. 15, pp. 791-797.
Radford et al., "Separating Sources of Manufacturing Distortion in Laminated Composites", Journal of Reinforced Plastics and Composites, first published May 1, 2000, vol. 19, No. 08/2000, pp. 621-641.
Rakic et al., "Algorithm for the determination of intrinsic optical constants of metal films: application to aluminum", Applied Optics, Aug. 1, 1995, vol. 34, No. 22, pp. 4755-4767.
Rakic et al., "Optical Properties of Metallic Films for Vertical-Cavity Optoelectronic Devices", Applied Optics, Aug. 1, 1998, vol. 37, No. 22, pp. 5271-5283.
Raman et al., "Passive radiative cooling below ambient air temperature under direct sunlight", Nature, Nov. 27, 2014, vol. 515, pp. 540-544.
Reha et al., "A Dual-Band Rectangular CPW Folded Slot Antenna for GNSS Applications", International Journal of Advanced Research in Electrical, Electronics and Instrumentation Engineering, Aug. 2014. pp. 11055-11061.
Rephaeli et al., "Absorber and emitter for solar thermo-photovoltaic systems to achieve efficiency exceeding the Shockley-Queisser limit", Optics. Express, Aug. 11, 2009, vol. 17, No. 17, pp. 15145-15159.
Santer et al., "Composite Tube Flexures at Nanosatellite Scale", 4th AIAA Space-craft Structures Conference, Jan. 9-13, 2017, 12 pgs.
Sasaki, "How Japan plans to build an orbital solar farm", printed from https://energy.gov/articles/space-based-solar-power, published Apr. 24, 2014.
Seffen et al., "Deployment dynamics of tape springs", Proceedings of the Royal Society of London A: Mathematical, Physical and Engineering Sciences, Mar. 9, 1999, vol. 455, , pp. 1003-1048.
Shaltout et al., "Time-varying metasurfaces and Lorentz non-reciprocity", Optical Materials Express, Nov. 1, 2015, vol. 5, No. 11, pp. 2459-2467.
Shin-Etsu, "Meeting the increasingly diverse and sophisticated needs of industry with the unique properties of silicone rubbers", Characteristic properties of Silicone Rubber Compounds, 2013, 16 pgs.
Sickinger et al., "Lightweight deployable booms: Design, manufacture, verification, and smart materials application", 55th International Astronautical Congress, Vancouver, Canada, Oct. 4-8, 2004, pp. 1-11.
Sihn et al., "Experimental studies of thin-ply laminated composites", Composites Science and Technology, May 1, 2007, vol. 67, pp. 996-1008.
Silva et al., "Performing Mathematical Operations with Metamaterials", Science, Jan. 10, 2014, vol. 343, No. 6167, pp. 160-163.
Stabile et al., "Coiling dynamic analysis of thin-walled composite deployable boom", Composite Structures, Mar. 29, 2014, vol. 113, pp. 429-436.
Steeves, "Multilayer Active Shell Mirrors", Thesis of John Steeves, May 5, 2015, 164 pgs.
Streyer et al., "Strong absorption and selective emission from engineered metals with dielectric coatings", Optics Express , Apr. 8, 2013, vol. 21, No. 7, pp. 9113-9122.
Stuart et al., "Absorption enhancement in silicon-on-insulator waveguides using metal island films,", Appl. Phys. Lett., Oct. 14, 1996, vol. 69, No. 16, pp. 2327-2329.
Stuart et al., "Island size effects in nanoparticle-enhanced photodetectors", Appl. Phys. Lett., Dec. 28, 1998, vol. 73, No. 26, pp. 3815-3817.
Svanberg et al., "An experimental investigation on mechanisms for manufacturing induced shape distortions in homogeneous and balanced laminates", Composites—Part A: Applied Science and Manufacturing, Jun. 1, 2001, vol. 32, pp. 827-838.
Torayca, "T800H Technical Data Sheet", Technical report No. CFA-007, 2 pgs.
Walker et al., "An investigation of tape spring fold curvature", Proceedings of the 6th International Conference on Dynamics and Control of Systems and Structures in Space, Citeseer, 2004, 10 pgs.
Walters et al., "Spenvis implementation of end-of-life solar cell calculations using the displacement damage dose methodology", in the Proceedings of the 19th Space Photovoltaic Research and Technology Conference, Feb. 1, 2007, 9 pgs.
Weinberg et al., "Radiation and temperature effects in gallium arsenide, indium phosphide, and silicon solar cells", National Aeronautics and Space Administration Technical Memorandum 89870, May 4-8, 1987, 14 pgs., published Feb. 1, 1987.
Wells et al., "Metamaterials-based Salisbury screens with reduced angular sensitivity", Appl. Phys. Lett., Oct. 21, 2014, vol. 105, pp. 161105-1-161105-4.
White et al., "Cure Cycle Optimization for the Reduction of Processing-Induced Residual Stresses in Composite Materials", Journal of Composite Materials, Dec. 1, 1993, vol. 27, No. 14, pp. 1352-1378.
Whorton et al., "Nanosail-D: the first flight demonstration of solar sails for nanosatellites", 22nd AIAA/USU Conference on Small Satellites, Aug. 11, 2008, pp. 1-6.

(56) References Cited

OTHER PUBLICATIONS

Wood, "Space-based solar power", printed Jul. 5, 2017 from https://energy.gov/articles/space-based-solar-power, Mar. 6, 2014, 7 pgs.
Wu et al., "Retarding the crystallization of PbI2 for highly reproducible planar-structured perovskite solar cells via sequential deposition", Energy & Environmental Science 7, Jun. 24, 2014, pp. 2934-2938.
Yamaguchi, "Radiation-resistant solar cells for space use", Solar Energy Materials & Solar Cells, 2001. vol. 68, pp. 31-53.
Yamaguchi et al., "Correlations for damage in diffused-junction InP solar cells induced by electron and proton irradiation", Journal of Applied Physics, May 1, 1997, vol. 81, No. 9, 6013-6018.
Yamaguchi et al., "Mechanism for the anomalous degradation of Si solar cells induced by high fluence 1 MeV electron irradiation", Applied Physics Letters, May 27, 1996, vol. 68, No. 22, pp. 3141-3143.
Yu et al., "A Broadband, Background-Free Quarter-Wave Plate Based on Plasmonic Metasurfaces", Nano Letters, Nov. 3, 2012, vol. 12, No. 12, pp. 6328-6333.
Yu et al., "Flat optics with designer metasurfaces", Nature Materials, published online Feb. 2014, vol. 13, pp. 139-150.
Zhang et al., "Infrared Refractive Index and Extinction Coefficient of Polyimide Films", International Journal of Thermophysics, May 1, 1998, vol. 19, No. 3, pp. 905-916.
Zheng et al., "Metasurface holograms reaching 80% efficiency", Nature Nanotechnology, published online Feb. 23, 2015, pp. 1-6.
Zhu et al., "Radiative cooling of solar cells", Optica, Jul. 22, 2014, vol. 1, pp. 32-38.
Zhu et al., "Radiative cooling of solar absorbers using a visibly transparent photonic crystal thermal blackbody", PNAS, Oct. 6, 2015, vol. 112, pp. 12282-12287.
Borriello et al., "Ab initio investigation of hybrid organic-inorganic perovskites based on tin halides", Physical Review B, Jun. 23, 2008, vol. 77, 235214, 9 pgs.
Conings et al., "Intrinsic thermal instability of methylammonium lead trihalide perovskite", Advanced Energy Materials, Jun. 2, 2015, DOI: 10.1002/aenm.201500477, 8 pgs.
Preston et al., "From plasmon spectra of metallic to vibron spectra of dielectric nanoparticles", Accounts of Chemical Research, Jan. 9, 2012, vol. 45, No. 9, pp. 1501-1510.
Scholl et al., "Quantum plasmon resonances of individual metallic nanoparticles", Nature, Mar. 22, 2012, vol. 483, doi:10.1038/nature10904, pp. 421-428.
Tsai et al., "High-efficiency two-dimensional Ruddlesden-Popper perovskite solar cells", Nature, Aug. 18, 2016, vol. 536, doi:10.1038/nature18306, 15 pgs.
Weinberg et al., "Radiation and temperature effects in gallium arsenide, indium phosphide, and silicon solar cells", NASA Technical Memorandum 89870, Washington, D.C., May 4-8, 1987, 14 pgs.
Zhang et al., "Intrinsic instability of the hybrid halide perovskite semiconductor CH3NH3PbI3", Chinese Physics Letters, Jun. 3, 2015, vol. 35, No. 3, 036104, 11 pgs.
Jaffe et al., "Development of a Sandwich Module Prototype for Space Solar Power", 2012 IEEE Aerospace Conference, Mar. 3-10, 2012, Big Sky, MT, USA, pp. 1-9, DOI: 10.1109/AERO.2012.6187077.
Jaffe et al., "Energy Conversion and Transmission Modules for Space Solar Power", Proceedings of the IEEE, Jun. 2013, vol. 101, No. 6, pp. 1424-1437, DOI: 10.1109/JPROC.2013.2252591.
Mankins, "SPS-ALPHA: The First Practical Solar Power Satellite via Arbitrarily Large Phased Array (A 2011-2012 NASA NIAC Phase 1 Project)", Artemis Innovation Management Solutions LLC, Sep. 15, 2012, NIAC Phase 1 Final Report, 113 pgs.
Rubenchik et al., "Solar Power Beaming: From Space to Earth", U.S. Department of Energy Office of Scientific and Technical Information, Apr. 14, 2009, Technical Report LLNL-TR-412782, 16 pgs. DOI: 10.2172/952766.

Sasaki et al., "A new concept of solar power satellite: Tethered-SPS", Acta Astronautica, 2006, vol. 60, pp. 153-165, doi:10.1016/j.actaastro.2006.07.010.
International Preliminary Report on Patentability for International Application PCT/US2015/030895, dated Nov 15, 2016, dated Nov. 24, 2016, 12 Pgs.
Banik et al., "Verification of a Retractable Solar Sail in a Thermal-Vacuum Environment", 51st AIAA/ASME/ASCE/AHS/ASC Structures, Structural Dynamics, and Materials Conference, Apr. 12-15, 2010, Orlando, Florida, doi: 10.2514/6.2010-2585, 11 pgs.
Leclerc et al., "Stress Concentration and Material Failure During Coiling of Ultra-Thin TRAC Booms", 2018 AIAA Spacecraft Structures Conference, Jan. 7, 2018, 16 pgs, doi: 10.2514/6.2018-0690.
Stohlman et al., "Thermal Deformation of Very Slender Triangular Rollable and Collapsible Booms", 3rd AIAA Spacecraft Structures Conference, San Diego, California, 2016, 15 pgs.
Extended European Search Report for European Application No. 16828571.6, Search completed Mar. 18, 2019, dated Mar. 22, 2019, 17 Pgs.
Extended European Search Report for European Application No. 16835856.2, Search completed Feb. 22, 2019 dated Mar. 1, 2019, 8 Pgs.
Johnson et al., "NanoSail-D: A Solar Sail Demonstration Mission", Acta Astronautica, 2011, Published Online Mar. 6, 2010, vol. 68, pp. 571-575, doi: 10.1016/j.actaastro.2010.02.008.
Mcnutt et al., "Near-Earth Asteroid Scout", American Institute of Aeronautics And Astronautics, AIAA Space 2014 Conference and Exposition, Aug. 4-7, 2014, San Diego, CA, 9 pgs., doi: 10.2514/6.2014-4435.
Murphey et al., "TRAC Boom Structural Mechanics", American Institute of Aeronautics and Astronautics, Jan. 9-13, 2017, Grapevine, TX, 4th AIAA Spacecraft Structures Conference, 13 pgs., doi: 10.2514/6.2017-0171.
Roybal et al., "Development of an Elastically Deployable Boom for Tensioned Planar Structures", American Institute of Aeronautics and Astronautics, Apr. 23-26, 2007, 48th AIAA/ASME/ASCE/AHS/ASC Structures, Structural Dynamics, and Materials Conference, 14 pgs., doi: 10.2514/6.2007-1838.
Romeo et al., "Unique space telescope concepts using CFRP composite thin-shelled mirrors and structures", 2007.
International Search Report and Written Opinion for International Application No. PCT/US2015/030895, completed Nov. 27, 2015, dated Nov. 30, 2015,14 Pgs.
International Search Report and Written Opinion for International Application No. PCT/US2015/030909, completed Nov. 27, 2015, dated Nov. 27, 2015, 13 Pgs.
International Search Report and Written Opinion for International Application PCT/US2015/030900, Completed Aug. 11, 2015, dated Aug. 13, 2015, 11 pgs.
International Search Report and Written Opinion for International Application PCT/US2015/033841, Completed Sep. 10, 2015, dated Sep. 11, 2015, 11 pgs.
Arya et al., "Wrapping Thick Membranes with Slipping Folds", American Institute of Aeronautics and Astronautics, date unknown, pp. 1-17.
Delapierre et al., "Spin-Stabilized Membrane Antenna Structures", American Institute of Aeronautics and Astronautics, date unknown, pp. 1-15.
NASA TV, "Solar Power, Origami-Style", printed Aug. 14, 2014 from http://www.nasa.gov/jpl/news/origami-style-power-20140814, 4 pgs.
International Preliminary Report on Patentability for International Application PCT/US2015/030900, dated Nov. 15, 2016, dated Nov. 24, 2016, 9 Pgs.
International Preliminary Report on Patentability for International Application PCT/US2015/030909, dated Nov. 15, 2016, dated Nov. 24, 2016, 11 Pgs.
International Preliminary Report on Patentability for International Application PCT/US2015/033841, dated Dec. 6, 2016, dated Dec. 15, 2016, 8 Pgs.

(56) References Cited

OTHER PUBLICATIONS

International Search Report and Written Opinion for International Application No. PCT/US2016/043424, completed Nov. 15, 2016, dated Nov. 15, 2016, 14 Pgs.
International Search Report and Written Opinion for International Application No. PCT/US2016/043677, completed Oct. 21, 2016, dated Oct. 21, 2016, 8 Pgs.
International Search Report and Written Opinion for International Application No. PCT/US2016/046389, completed Nov. 22, 2016, dated Nov. 22, 2016, 11 Pgs.
International Search Report and Written Opinion for International Application No. PCT/US2016/046394, completed Nov. 17, 2016, dated Nov. 17, 2016, 12 Pgs.
International Search Report and Written Opinion for International Application No. PCT/US2016/046415, completed Nov. 17, 2016, dated Nov. 17, 2016, 10 Pgs.
International Search Report and Written Opinion for International Application No. PCT/US2016/046421, completed Nov. 17, 2016, dated Nov. 17, 2016, 10 Pgs.
Aieta et al., "Multiwavelength achromatic metasurfaces by dispersive phase compensation", Science, vol. 347, Issue 6228, DOI:10.1126/science.aaa2494, Mar. 20, 2015, pp. 1342-1345.
Aoki et al., "A Fully Integrated Quad-Band GSM/GPRS Power Amplifier", IEEE Journal of Solid-State Circuits, vol. 43, Issue 12, Dec. 12, 2008, pp. 2747-2758.
Bakr et al., "Impact of phase and amplitude errors on array performance", UC Berkeley Technical Report No. UCB/EECS-2009-1. Retrieved from http://www.eecs.berkeley.com/Pubs/TechRpts/2009/EECS-2009-1.html, Jan. 1, 2009, 12 pgs.
Bohn et al., "Fully Integrated Frequency and Phase Generation for a 6-18GHz Tunable Multi-Band Phased-Array Receiver in CMOS", Radio Frequency Integrated Circuits Symposium (RFIC), Apr. 17-Jun. 17, 2008. IEEE, pp. 439-442.
Brongersma et al., "Light management for photovoltaics using high-index nanostructures", Nature Materials, vol. 13, No. 25, May 2014, pp. 451-460.
Callahan et al., "Light trapping in ultrathin silicon photonic crystal superlattices with randomly-textured dielectric incouplers", Optics Express, vol. 21, Issue 25, DOI: 10.1364/OE.21.030315, 2013, pp. 30315-30326.
Campbell et al., "A Pixel Readout Chip for Mrad in Standard 0.25um CMOS", IEEE Transactions on Nuclear Science, vol. 46, issue: 3, Jun. 1999, pp. 156-160.
Cao et al., "A 4.5MGy TID-Tolerant CMOS Bandgap Reference Circuit Using a Dynamic Base Leakage Compensation Technique", IEEE Transactions on Nuclear Science, vol. 60, issue 4, Aug. 2013, pp. 2819-2824.
Geisz et al., "Infrared Reflective and Transparent Inverted Metamorphic Triple Junction Solar Cells", AIP Conference Proceedings, vol. 1277, Issue 11, pp. 11-15, Oct. 14, 2010.
Kaltenbrunner et al., "Flexible high power-per-weight perovskite solar cells with chromium oxide-metal contacts for improved stability in air", Nature Materials, vol. 14, doi:10.1038/nmat4388, Aug. 24, 2015, pp. 1032-1039.
Lacoe, R. C., "Improving Integrated Circuit Performance Through the Application of Hardness-by-Design Methodology", IEEE Transactions on Nuclear Science, vol. 55, issue: 4, Aug. 2008, pp. 1903-1925.
Lamoureux et al., "Dynamic kirigami structures for integrated solar tracking", Nature Communications, DOI:10.1038/ncomms9092, Sep. 8, 2015, pp. 1-6.
Lohmeyer et al., "Correlation of GEO communication satellite anomalies and space weather phenomena: Improved satellite performance and risk mitigation", paper presented at 30th AIAA International Communications Satellite Systems Conference (ICSSC), Ottawa, Canada, pp. 1-20, Jul. 13, 2012.
Messenger et al., "Status of Implementation of Displacement Damage Dose Method for Space Solar Cell Degradation Analyses", 2008 Dd EOL Calc via SPENVIS manuscript SRM2, Jan. 2008, 8 pgs.
Narita et al., "Development of high accuracy phase control method for space solar power system", Proc. IEEE International Microwave Workshop Series on Innovative Wireless Power Transmission: Technologies, Systems, and Applications, May 12-13, 2011, p. 227-230.
Nishioka et al., "Evaluation of temperature characteristics of high-efficiency InGaP/InGaAs/Ge triple-junction solar cells under concentration", Solar Energy Materials and Solar Cells, vol. 85, Issue 3, Jan. 31, 2005, pp. 429-436.
O'Brien et al., "The AE9/AP9 Radiation Specification Development", Aerospace Corporation, Sep. 15, 2009, Report No. TOR-2009(3905)-8, 29 pgs.
Petrovic et al., "Design Methodology for Fault Tolerant ASICs", IEEE 15th International Symposium, Design and Diagnostics of Electronic Circuits & Systems (DDECS), Apr. 18-20, 2012, pp. 8-12.
Rephaeli et al., "Ultrabroadband Photonic Structures to Achieve High-Performance Daytime Radiative Cooling", Nano Letters, vol. 13, Mar. 5, 2013, pp. 1457-1461.
Sato et al., "Modeling of degradation behavior of InGaP/GaAs/Ge triple-junction space solar cell exposed to charged particles", Journal of Applied Physics, vol. 105, 2009, pp. 044504-1-044504-6.
Silverman et al., "Outdoor Performance of a Thin-Film Gallium-Arsenide Photovoltaic Module", presented at the 39th IEEE Photovoltaic Specialist Conference, Conference Jun. 16-21, 2013, Tampa, Florida, USA, 6 pgs.
Snoeys et al., "Integrated Circuits for Particle Physics Experiments", IEEE Journal Solid-State Circuits, vol. 35, issue 12, Dec. 2000, pp. 2018-2030.
Wang et al., "A Broadband Self-Healing Phase Synthesis Scheme", Radio Frequency Integrated Circuits Symposium (RFIC), IEEE, Jun. 5-7, 2011, 4 pgs.

* cited by examiner

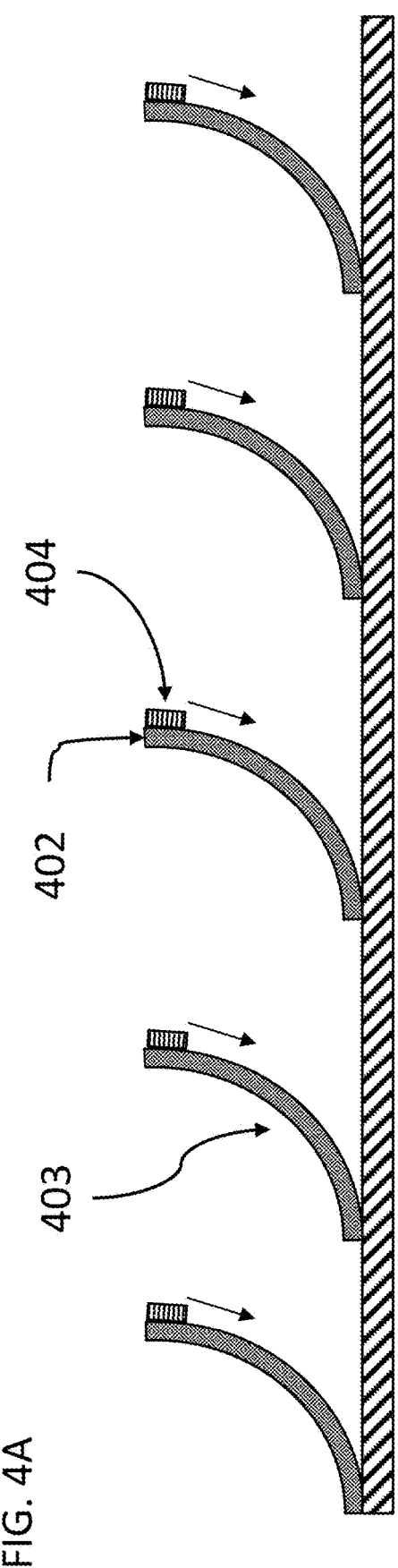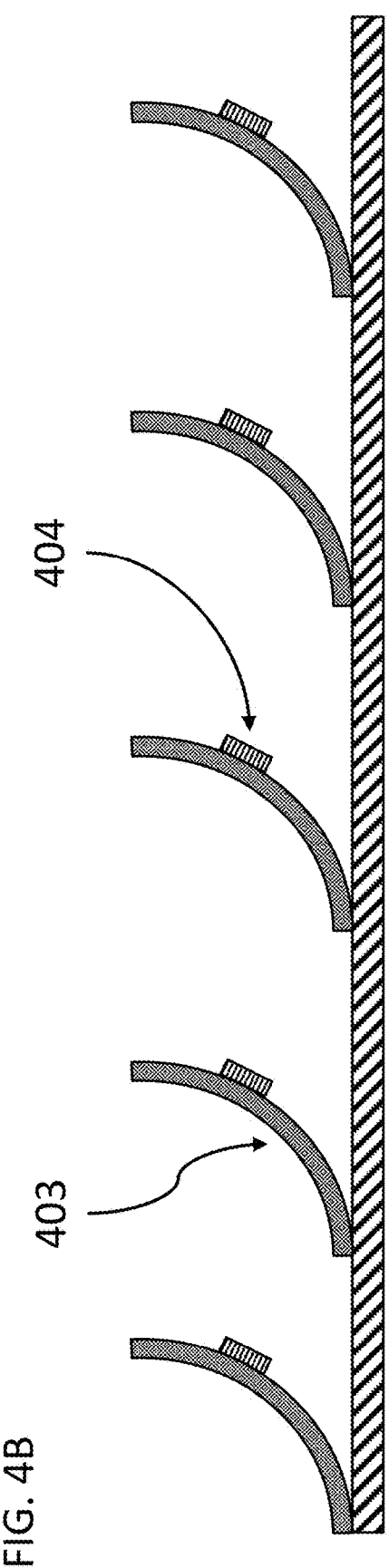

| | $k_{0°}$ (W/m*K) | $k_{90°}$ (W/m*K) | $k_z$ (W/m*K) |
|---|---|---|---|
| YSH-70A-60S | 42.7 | 84.0 | 1.5 |
| M55J | 26.9 | 52.3 | 1.5 |
| T800H | 6.9 | 12.3 | 1.4 |

(Values for $V_f = 50\%$)

COMPACTABLE POWER GENERATION ARRAYS

CROSS-REFERENCE TO RELATED APPLICATIONS

The current application claims priority to the following U.S. Provisional Patent Applications: 62/203,159, filed Aug. 10, 2015; 62/220,017, filed Sep. 17, 2015; 62/239,706, filed Oct. 9, 2015; 62/264,500, filed Dec. 8, 2015; 62/268,632, filed Dec. 17, 2015; 62/270,425, filed Dec. 21, 2015; 62/294,859, filed Feb. 12, 2016; 62/295,947, filed Feb. 16, 2016; 62/320,819, filed Apr. 11, 2016; 62/330,341, filed May 2, 2016; 62/340,644, filed May 24, 2016; 62/352,292, filed Jun. 20, 2016; and 62/366,720, filed Jul. 26, 2016 the disclosures of each of which are incorporated herein by reference.

FIELD OF THE INVENTION

The present invention is related to solar power generation arrays including a plurality of solar powered modules, as well as power generation tiles, which can be implemented within space-based satellite modules.

BACKGROUND

Space-based solar structures describe physical structures capable of solar energy collection while deployed in a space environment. Space-based solar structures are designed to collect solar energy and convert it into electric energy for a variety of uses including powering the structure itself to wirelessly transmitting the energy to another structure either space-based or ground based. Space-based solar structures can include a variety of structures ranging from a single satellite to an array of satellites.

A general limitation of space-based solar structures is the size required to generate a commercially viable energy source. Large arrays are necessary in order to produce a commercially viable amount of energy. The current cost to launch a space-based solar structure is close to $20,000 per kilogram of material. While those costs have the potential to decrease with the advancement of rocket system technology, the cost for placing objects in space are likely to remain a limiting factor for constructing large scale space-based structures for the foreseeable future. The cost limitation for launching large scale structures into space requires space-based systems to reduce volume and weight as much as possible.

The general limitation of commercial viability has driven development in space-based structures that are more compactable and light weight. In contrast, ground based solar structures do not face the same limitations. Ground based solar structures do not have the added cost of launching into space and therefore do not have to be compactable or light weight. Rather, terrestrial-based systems are generally rigid and bulky. Furthermore terrestrial-based systems can and must be expanded to be large scale in order to be efficient. Finally, without the added cost of launching into space, terrestrial systems can be expanded over time without much added expense.

SUMMARY OF THE INVENTION

An apparatus in accordance with the many embodiments of the invention provides a compactable solar power generation array.

In a number of embodiments the solar power generation array includes:
  at least one structural substrate body;
  an array of at least two solar concentrators disposed on the at least one structural substrate body, each of the at least two solar concentrators comprising a curved body having a front reflector surface and a back surface, and a first edge pivotably connected to said structural substrate body through at least one resilient connector and a second edge disposed opposite said first edge;
  at least one photovoltaic cell disposed on at least a portion of the back surface of each of the solar concentrators;
  wherein the at least two solar concentrators are deployable between a compacted configuration wherein the first and second edges and the curved body of each of the at least two solar concentrators are positioned parallel to the plane of the at least one structural substrate body and a deployed configuration wherein the second edge and curved body of each of the at least two solar concentrators are positioned out of plane from the plane of the at least one structural substrate body;
  wherein said resilient connector is placed under stress through the application of a holding force when the solar concentrator is disposed in the compacted configuration such that the solar concentrator articulates to the deployed configuration upon removal of the holding force; and
  wherein when disposed in the deployed configuration, each of the solar concentrators is configured to receive and re-direct solar radiation onto the at least one photovoltaic cell disposed on an adjacent solar concentrator.

In another embodiment, the power generation array includes solar concentrators configured to maintain a parabolic shape upon self-deployment.

In still another embodiment, the power generation array includes at least one photovoltaic cell disposed near the second edge of the at least two solar concentrators.

In yet another embodiment, the power generation array includes at least one photovoltaic cell disposed upon a middle portion of the back surface of the at least two solar concentrators.

In still yet another embodiment, the power generation array includes at least one photovoltaic cell further comprising at least one cover glass layer.

In a further embodiment, the power generation array further includes at least one photovoltaic cell further comprising double sided cover glass layers.

In still a further embodiment, the power generation array includes at least two solar concentrators further comprising a carbon fiber matrix.

In yet a further embodiment, the power generation array includes solar concentrators having at least three carbon fiber layers.

In still yet a further embodiment, the power generation array includes a reflective material disposed on the front reflector surface, wherein the reflective material is selected from a group consisting of gold, silver, aluminum, Kapton, and carbon fiber.

In another embodiment, the power generation array includes at least one layer of dielectric material disposed upon each of the at least two solar concentrators.

In still another embodiment, the power generation array further includes at least two solar concentrators further including a plurality of layers having at least a radiative layer, a structural film layer disposed upon the radiative layer, a heat dissipation layer disposed upon the structural film layer, and a reflective layer disposed upon the heat dissipation layer.

In yet another embodiment, the power generation array further includes a flexibly rigid compactable pre-stressed structural support layer.

In still yet another embodiment, the power generation array includes a structural support layer comprising a carbon fiber matrix support system.

In a further embodiment, the power generation array includes a structural support layer comprising at least three carbon fiber layers.

In still a further embodiment, the power generation array includes at least one structural substrate body comprising a carbon fiber matrix.

In yet a further embodiment, the power generation array includes at least one power transmitter electromechanically connected to the at least one photovoltaic cell.

In another embodiment, the compactable power generation array includes:
a first structural substrate body;
a second structural substrate body;
at least one flexibly rigid connection member compactably connected to the first and second substrate bodies through at least one first resilient connector wherein the first and second structural substrate bodies are deployable between a compacted configuration wherein the first structural substrate body is positioned parallel to the plane of and directly a top of the second structural substrate body and a deployed configuration wherein the first structural substrate body is separated from the second structural substrate body by a space determined by the configuration of the connection member; wherein the resilient connector is placed under stress through a holding force when the first and second structural substrate bodies are disposed in the compacted configuration such that the first structural substrate body self-articulates to a deployed configuration upon the removal of the holding force;
an array of at least two solar concentrators disposed upon the first structural substrate body, each of the at least two solar concentrators comprising a curved body having a front reflector surface and a back surface, and a first edge pivotably connected to the first structural substrate body through at least one second resilient connector and a second edge disposed opposite said first edge;
at least one photovoltaic cell disposed on at least a portion of the back surface of each of the solar concentrators;
wherein the at least two solar concentrators are deployable between a compacted configuration wherein the first and second edges and the curved body of each of the at least two solar concentrators are positioned parallel to the plane of the first and second structural substrate bodies and a deployed configuration wherein the second edge and curved body of each of the at least two solar concentrators are positioned out of plane from the plane of the first structural substrate body; and
wherein said second resilient connector is placed under stress through the application of a holding force when the solar concentrator is disposed in the compacted configuration such that the solar concentrator articulates to the deployed configuration upon removal of the holding force; and wherein when disposed in the deployed configuration, each of the solar concentrators is configured to receive and re-direct solar radiation onto the at least one photovoltaic cell disposed on an adjacent solar concentrator.

In still another embodiment, the power generation array includes a first and a second structural substrate body further comprising a carbon fiber matrix.

In yet another embodiment, the power generation array includes at least one connection member further comprising a carbon fiber matrix.

In still yet another embodiment, the power generation array further includes solar concentrators configured to maintain a parabolic shape upon self-deployment.

In a further embodiment, the power generation array includes at least one photovoltaic cell disposed near the second edge of the at least two solar concentrators.

In still a further embodiment, the power generation array includes at least one photovoltaic cell disposed upon a middle portion of the at least two solar concentrators.

In still yet a further embodiment, the power generation array includes at least one photovoltaic cell further comprising at least one cover glass layer.

In another embodiment, the power generation array further includes at least one photovoltaic cell comprising double sided cover glass layers.

In still another embodiment, the power generation array further includes at least two solar concentrators comprising a carbon fiber matrix.

In yet another embodiment, the power generation array further includes a carbon fiber matrix comprising at least three carbon fiber layers.

In still yet another embodiment, the power generation array further includes a reflective material disposed on the front solar concentrator surface, wherein the reflective material is selected from a group consisting of gold, silver, aluminum, Kapton, and carbon fiber.

In a further embodiment, the power generation array includes at least one layer of dielectric material disposed upon each of the at least two solar concentrators.

In still a further embodiment, the power generation array includes at least two solar concentrators further comprising a plurality of layers having at least a radiative layer, a structural film layer disposed upon the radiative layer, a heat dissipation layer disposed upon the structural film layer, and a reflective layer disposed upon the heat dissipation layer.

In yet a further embodiment, the power generation array includes a flexibly rigid compactable pre-stressed structural support layer.

In still yet a further embodiment, the power generation array includes a structural support layer comprising a carbon fiber matrix support system.

In another embodiment, the power generation array further includes a carbon fiber matrix support system comprising at least three carbon fiber layers.

In still another embodiment, the power generation array further includes at least one power transmitter electromechanically connected to the at least one photovoltaic cell.

In still yet another embodiments, the at least one power transmitter is disposed on the second structural substrate body.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein:

FIG. 4A conceptually illustrates a version of a compactable power generation array in which the PV cell is located at the tip of the concentrator in accordance with some embodiments.

FIG. 4B conceptually illustrated a version of a compactable power generation array in which the PV cell position is located in the middle portion on the back surface of the concentrator in accordance with some embodiments.

DETAILED DESCRIPTION

Figure 1A:
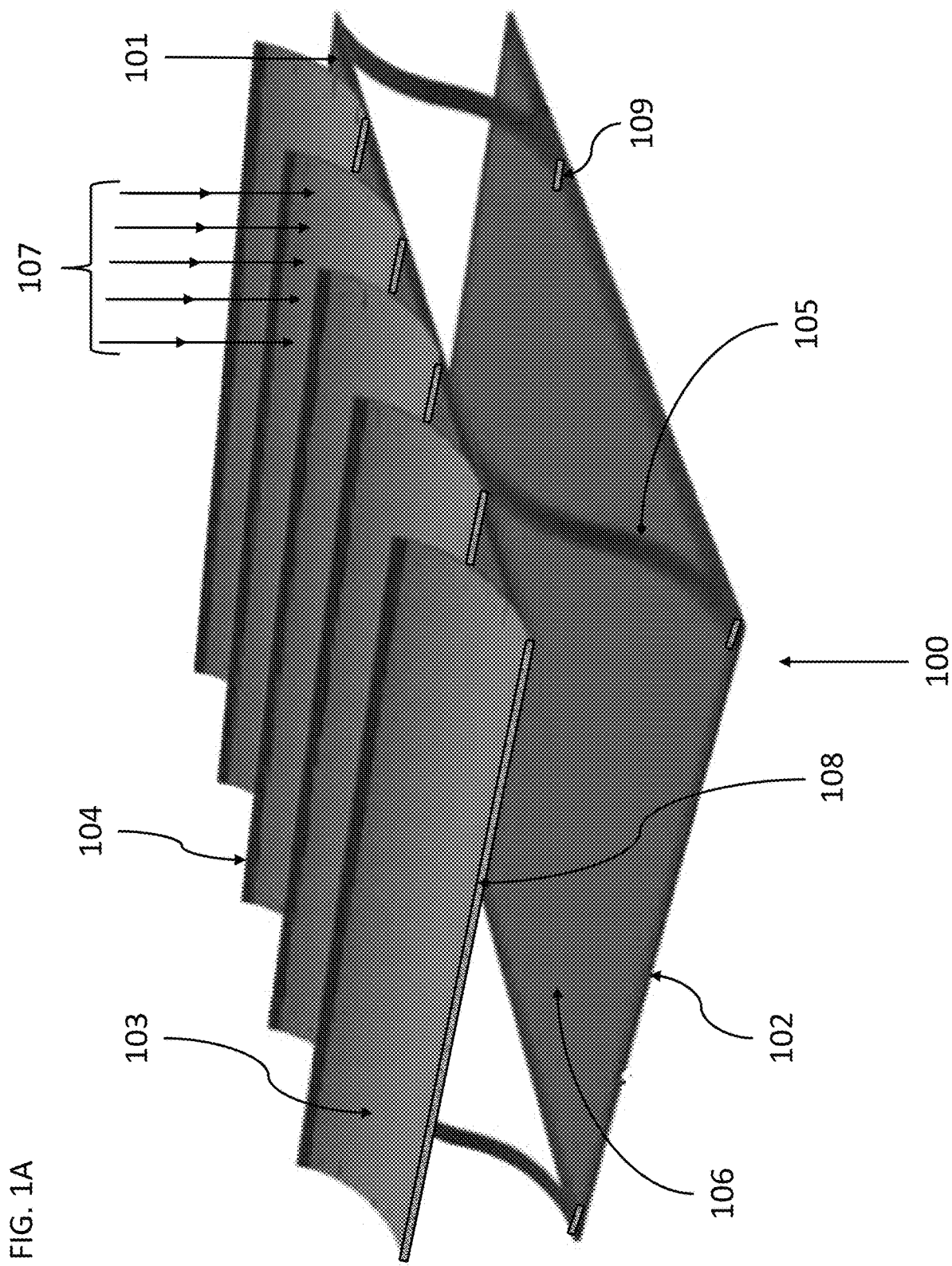
FIG. 1A conceptually illustrates an isometric view of a compactable power generation array in a deployed configuration in accordance with some embodiments.

Turning now to the drawings, compactable power generation arrays in accordance with various embodiments of the invention are illustrated. In many embodiments, the compactable power generation arrays may comprise a structural substrate body having an array of solar concentrators configured to receive and re-direct solar radiation onto a plurality of photovoltaic (PV) cells. In many other embodiments the PV cells may be disposed upon a back surface of each of the solar concentrators such that an adjacent solar concentrator is configured to re-direct solar radiation onto the PV cell disposed on the back surface of the adjacent solar concentrator. In still other embodiments, the PV cells may be disposed in a variety of locations on the back surface of each of the concentrators to improve heat dissipation and overall power generation of the array. Additionally, the PV cells may comprise multiple glass layers for improved heat dissipation. Furthermore, the array configuration may comprise at least one power transmitter. In many embodiments, the structural substrate of the tile may comprise a plurality of layers or levels configured to self-deploy or separate during operational conditions. The separation and self-deployment of the plurality of layers may be realized through the integration of springs or struts attached to resilient connectors and configured to compress during non-deployment conditions. In accord with the many embodiments, the springs or struts may be formed of a carbon fiber substrate. In many embodiments herein, the solar concentrators and tiles may be formed with a flexibly rigid substrate to facilitate self-deployment.

In accord with the many embodiments, the concentrators may be configured in a variety of efficient shapes to include a parabolic concentrator shape. The parabolic concentrators, in accordance with the many embodiments, may comprise a variety of different materials. In some embodiments a plurality of pre-formed carbon fiber layers may act as the concentrator and self-deploying spring structure of the concentrator. In some embodiments the pre-formed carbon fibers may have an additional layer disposed thereon configured to redirect or reflect solar radiation onto the PV cells on at least one adjacent concentrator. In yet other embodiments, the pre-formed carbon fiber may be configured to be self-reflective without the requirement of an additional reflective layer. Additionally, in accord with the many embodiments of the invention, the pre-formed carbon fiber concentrators may comprise a variety of different carbon fiber configurations to include different layup angles and different material characteristics or a combination thereof for improved self-deployment and power generation capabilities. Furthermore, in some embodiments of the invention the solar concentrators may contain an additional dielectric layer to improve the overall power generation of the array.

In other embodiments, the concentrators may be configured to comprise a plurality of different layers of materials to include any suitable carbon fiber, Kapton film, a reflector material, such as aluminum, gold, and silver or a combination thereof. In many embodiments, the carbon fiber may be combined with the Kapton film and a reflector material and serve as a self-deployment spring and shape retainer of the solar concentrators. In yet other embodiments the Kapton film and reflective material may be disposed upon another material acting as a self-deploying spring.

A power generation array refers to an individual solar power collecting and transmitting element that may be integrated into a solar panel or module for use in a number of large-scale space-based solar power stations. Each power generation array may include structures such as radiation collectors for focusing solar radiation on the photovoltaic cell, thermal radiators for regulating the temperature of the power generation array, and radiation shielding, among other structures. In many embodiments a power generation array is a modular solar radiation collector, converter and transmitter that collects solar radiation through at least one photovoltaic cell and uses the electrical current to provide power to at least one power transmitter collocated on the same array that transmits the converted power to one or more remote power receiving collectors.

A solar concentrator refers to an individual solar reflector within a power generation tile. The concentrator includes a structural substrate and a reflector surface. The concentrator is any device that re-directs solar radiation and concentrates the radiation onto a specific photovoltaic cell.

A photovoltaic cell (PV) refers to an individual solar power collecting element on a power generation array. The PV includes any electrical device that converts the energy of light directly into electricity by the photovoltaic effect including elements made from polysilicon and monocrystalline silicon, thin film solar cells that include amorphous silicon, CdTe and CIGS cells, multijunction cells, perovskite cells, organic/polymer cells, and various alternatives thereof.

A power transmitter or radiator refers to an individual radiative element on a power generation array and its associated control circuitry. A power transmitter can include any device capable of converting power in the electrical current generated by the PV to a wireless signal, such as microwave radiation or light, including (but not limited to) a laser, a klystron, a traveling-wave tube, a gyrotron, or suitable transistor and/or diode. A power transmitter may also include suitable transmissive antennas, such as, dipole, patch, helical or spherical antennas, among others.

A large-scale space-based solar power station or simply solar power station refers to a collection of satellite modules being flown in an orbital array formation designed to function as one or more phased arrays. In embodiments the one or more phased arrays may be operated to direct the collected solar radiation to one or more power receiving collectors.

Large-scale space-based solar power stations may comprise an array of modules or panels that may incorporate a plurality of power generation arrays. Typical similar systems utilize mechanically linked rigid structures for the deployment of solar panel arrays. Such structures are often large with relatively high mass per unit ratio. The use of typical rigid structures within a large-scale space-based solar power station can dramatically increase the weight of the overall structure; thus increasing the cost of manufacture and deployment. The structure, size, and complexity of the large-scale space-based solar power stations require the most efficient power generation possible to ensure the commercial viability of the overall system. The use of light weight compactable power generation arrays can ultimately aid in reducing the overall weight of the deployed structure. Furthermore, the use of self-deploying components can eliminate the number of mechanical linkages thus improving weight issue and longevity of the system.

In many embodiments efficient power generation arrays can be implemented. The implementation of such power generation arrays within the described large-scale space-based solar power systems can make them more practical insofar as they can offer greater power generation per unit mass. As can be appreciated, power generation tiles having a reduced mass can be advantageous for at least two reasons: (1) they can allow for reduced launch costs—i.e. a reduced payload can be cheaper to send into outer space; and (2) they can enable easier maneuverability of corresponding satellite modules. Against this backdrop, in many embodiments, lightweight substrates that are flexibly rigid can be used in conjunction with thin film pliable photovoltaic materials to create the structural support and overall structure of the power generation tiles.

Compactable Power Generation Array

Figure 1B:
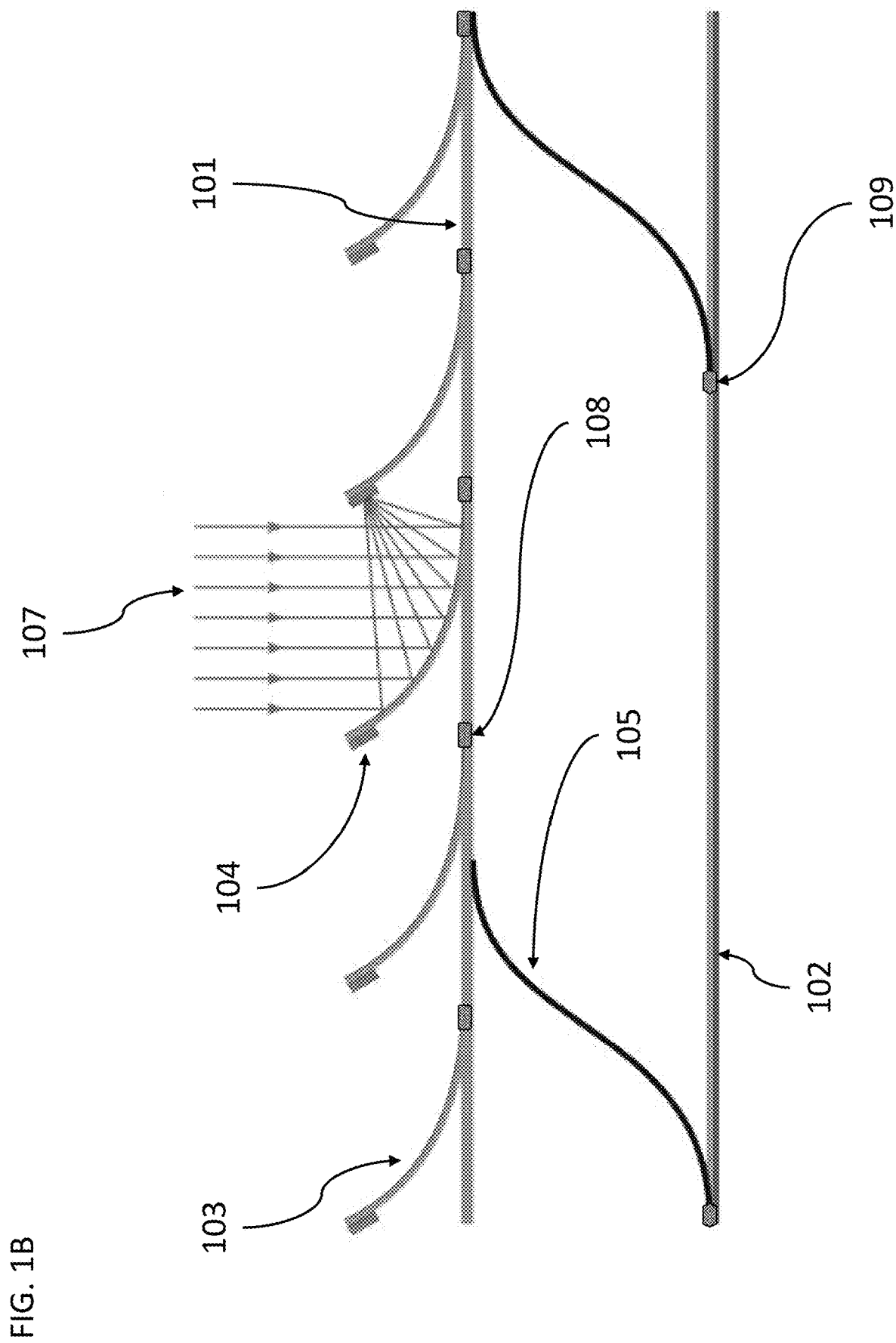
FIG. 1B conceptually illustrates a profile view of a compactable power generation array in a deployed configuration further illustrating the function of the solar concentrators on the upper substrate body of the power generation array in accordance with some embodiments.

Turning to the figures, in many embodiments the power generation arrays may have further compactible and expandable features and structures disposed thereon. FIGS. 1A and 1B illustrate various embodiments of a power generation array in a deployed configuration wherein the upper structural substrate body 101 may be compactably connected to a lower structural substrate body 102 through a plurality of connection members 105 such as springs, struts, or tension arms and interconnected connection member resilient connectors 109. In some embodiments solar concentrators 103 may be disposed upon the upper substrate body 101 within the power generation array 100 connected through an array of concentrator resilient connectors 108, whereby once deployed the concentrators 103 may efficiently redirect solar radiation 107 toward an associated photovoltaic cell 104 located on an adjacent solar concentrator 103. In many embodiments the photovoltaic cell 104 is electromechanically connected to a power transmitter 106 which in some embodiments may be disposed upon a lower structural substrate body 102 of the power generation array 100.

In many embodiments, deployment mechanisms are provided to deploy the compacted power generation arrays (e.g., move the compactible elements of the satellite module from a compacted to a deployed configuration). In FIGS. 1A and 1B various embodiments of an upper structural substrate body 101 having an array of solar concentrators 103 disposed thereon are illustrated in which the solar concentrators 103 may be connected to the substrate body 101 via an array of resilient connectors 108. In many embodiments, the resilient connectors 108 may be an active or passive mechanism such that when activated the compacted concentrators may be articulated into a deployed operational configuration.

Figure 2:
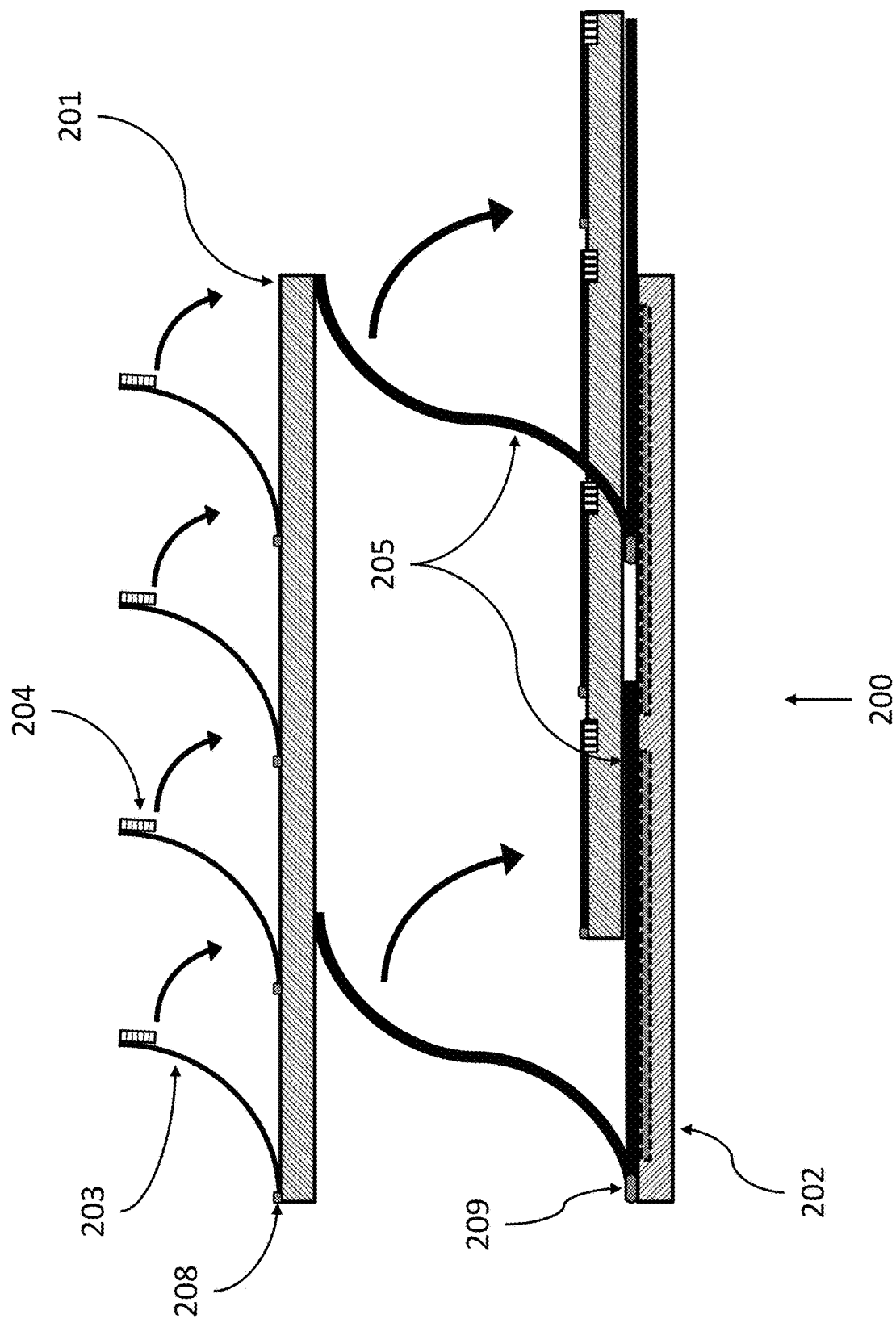
FIG. 2 conceptually illustrates a profile view of a compactable power generation array in both a compacted and deployed configurations in accordance with some embodiments.

It can be appreciated that in some embodiments of the power generation arrays, the photovoltaic cell, the concentrator and power transmitter may be movably interrelated through a generally compactable structure, such that when in a compacted configuration the elements of the power generation array are compressed together to occupy a total volume that is less than when in a deployed configuration. For example in some deployed configurations the substrate 201 having the collectors 203 and photovoltaic cells 204 disposed thereon, and the substrate 202 having the power transmitter (not shown) may be separated by a gap (e.g., to create a vertical offset there between) as shown in FIG. 2. FIG. 2 demonstrates that such a gap may be managed by the use of connection members 205, either spring or tension arms or similar. An additional embodiment may include the use of resilient connectors 209 to assist in the deployment of the array 200 and solar concentrators 203. Furthermore, in the compacted state, as illustrated in FIG. 2, it can be appreciated that the concentrators 203 and the connection members 205 may also be compacted or folded to a flattened position to reduce the total volume occupied by the power generation array 200. Such compactable structures may also incorporate packaging techniques such as one or a combination of z-folding, wrapping, rolling, fan-folding, double z-folding, Miura-ori, slip folding and symmetric wrapping may be used, among others. Such packaging techniques, in some embodiments, may represent a force applied to the resilient connectors of the connection member 209 and the resilient connectors of the concentrators 208.

Figure 3:
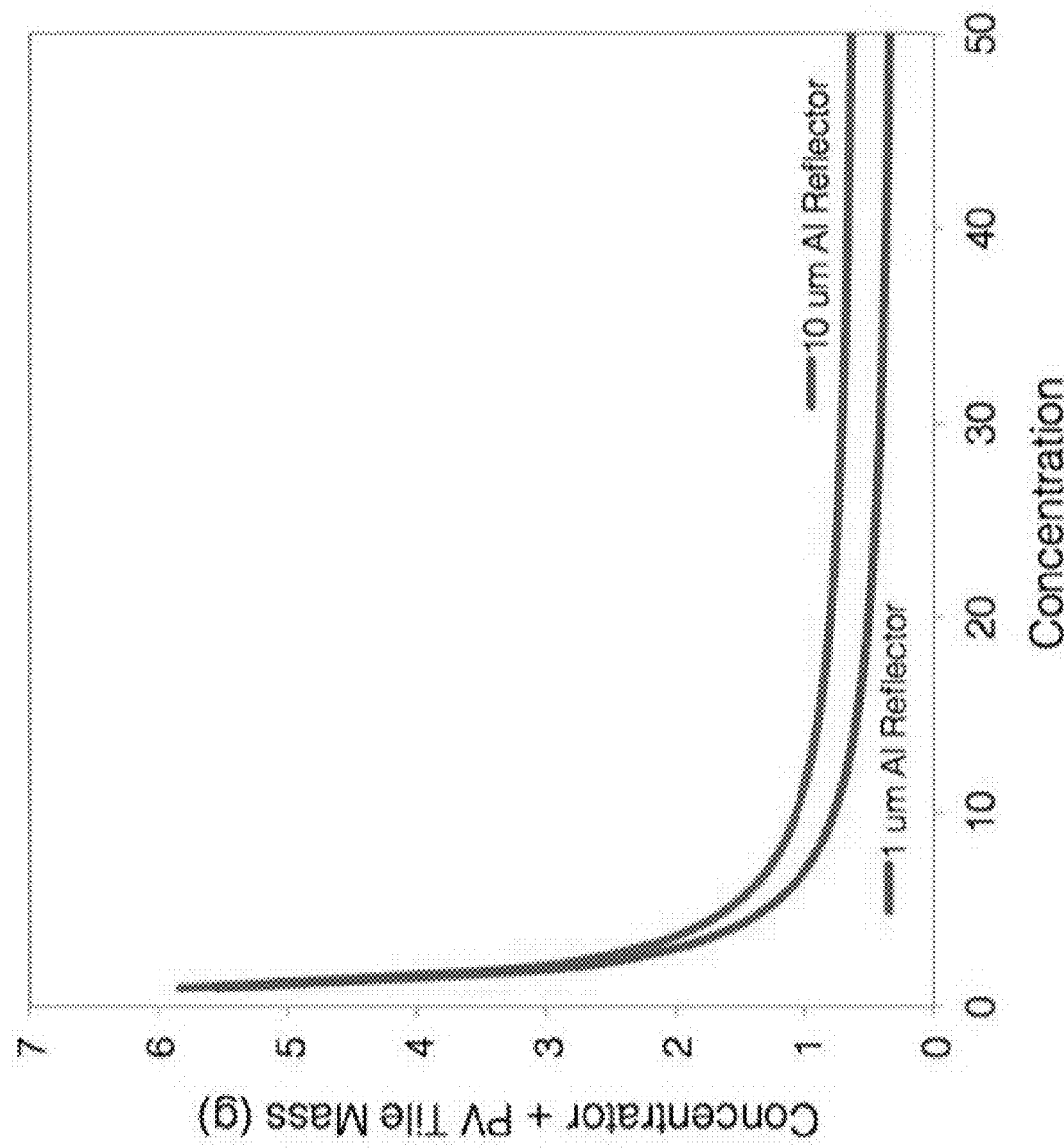
FIG. 3 provides a data graph of the concentration of the power generation array as a function of concentrator and PV cell mass in accordance with some embodiments.

In a number of embodiments, concentrators are implemented that redirect solar radiation toward an associated photovoltaic cell, such that the photovoltaic cell can experience greater solar flux relative to the case where no concentrators are used. As can be appreciated, the amount of electrical current that a corresponding PV cell is able to produce is directly related to the incident solar radiation (accounting for its concentration/flux). In this way, for a given target power generation value, the utilization of concentrators can allow the amount of photovoltaic materials used, along with respective attendant radiative shielding (which can be relatively massive), to be reduced. FIG. 3 illustrates a chart demonstrating how the combined mass of a concentrator and a PV cell diminishes as a function of concentration. In particular, the data in the graph is for a 10 cm by 10 cm power generation array, with 5 1-dimensional solar collector/PV elements in accordance with embodiments, a 100 µm cover glass, with 30 um copper back contact/structural support, a 1 µm GaAs photovoltaic film, supported by a 12.5 µm KAPTON polyimide substrate. Thus, it is illustrated how the mass of a corresponding power generation array can be substantially reduced using an array of such concentrators.

The concentrators may take any suitable form in accordance with the many embodiments of the invention. It can be appreciated that concentrators can also be implemented in a variety of geometric configurations. For example, FIGS. 1A, 1B, and 2 illustrate an example embodiment of concentrators 103 or 203 in a parabolic trough configuration. The particular characteristics of the parabolic shapes can be adjusted depending on the particular application of the power generation array.

In many embodiments, a staggered configuration is implemented, whereby concentrators redirect solar radiation towards photovoltaic cells that are disposed on the back surface of adjacently disposed concentrators. FIGS. 1A, 1B and 2 illustrate a staggered-type configuration that can be implemented in accordance with certain embodiments of the invention. More specifically, FIG. 1A illustrates an isometric view of embodiments a staggered configuration. In particular, it is depicted that the configuration 100 includes a plurality of concentrators 103, each having a photovoltaic cell 104 disposed on a back surface. The photovoltaic cells are disposed such that the concentrators 103 redirect solar radiation onto a photovoltaic cell that is disposed the on back surface of an adjacent concentrator. FIG. 1B illustrates a generalized understanding of the operation of embodiments of the staggered-type configuration. In particular, it is illustrated that solar radiation 107 is redirected by a respective concentrator 103 onto a photovoltaic cell 104 that is disposed on the back surface of an adjacent concentrator. As can be gathered from the above discussion, the concentrators 103 can be curved so as to focus the solar radiation 107 onto the targeted photovoltaic cell 104. It should be clear that embodiments of the invention are not constrained to the precise manifestation of these operating principles. Rather, the understood generalized operating principles are discussed here to facilitate the understanding of the discussed structure.

In several embodiments, configurations are implemented that facilitate the radiative cooling of the photovoltaic cells, which can allow them to generate power more efficiently. As can be appreciated, photovoltaic cells can heat up extensively during operation, and heat can adversely impact a photovoltaic cell's ability to produce electrical current.

Staggered-type configurations can be advantageous insofar as each of the concentrators can act as a heat sink for a coupled PV cell, thereby facilitating conductive and radiative cooling, and consequently a more efficient PV cell operation. In some embodiments of the invention the position of the coupled PV cell can vary in order to better facilitate cooling of the PV cell. As illustrated in FIG. 4A, in accord with many embodiments of the invention, the PV cell 404 can be located at or near the free edge 402 of the concentrator 403. Additionally, FIG. 4B illustrates an alternative shifted position of the PV Cell 404. In accordance with many embodiments of the invention the PV cell 404 may be located near the center of the concentrator 403 to allow for a dual path of heat dissipation. It can be appreciated that many alternative locations of the PV cell can be incorporated for efficient heat dissipation and a more efficient operation of the power generation array.

Figure 5:
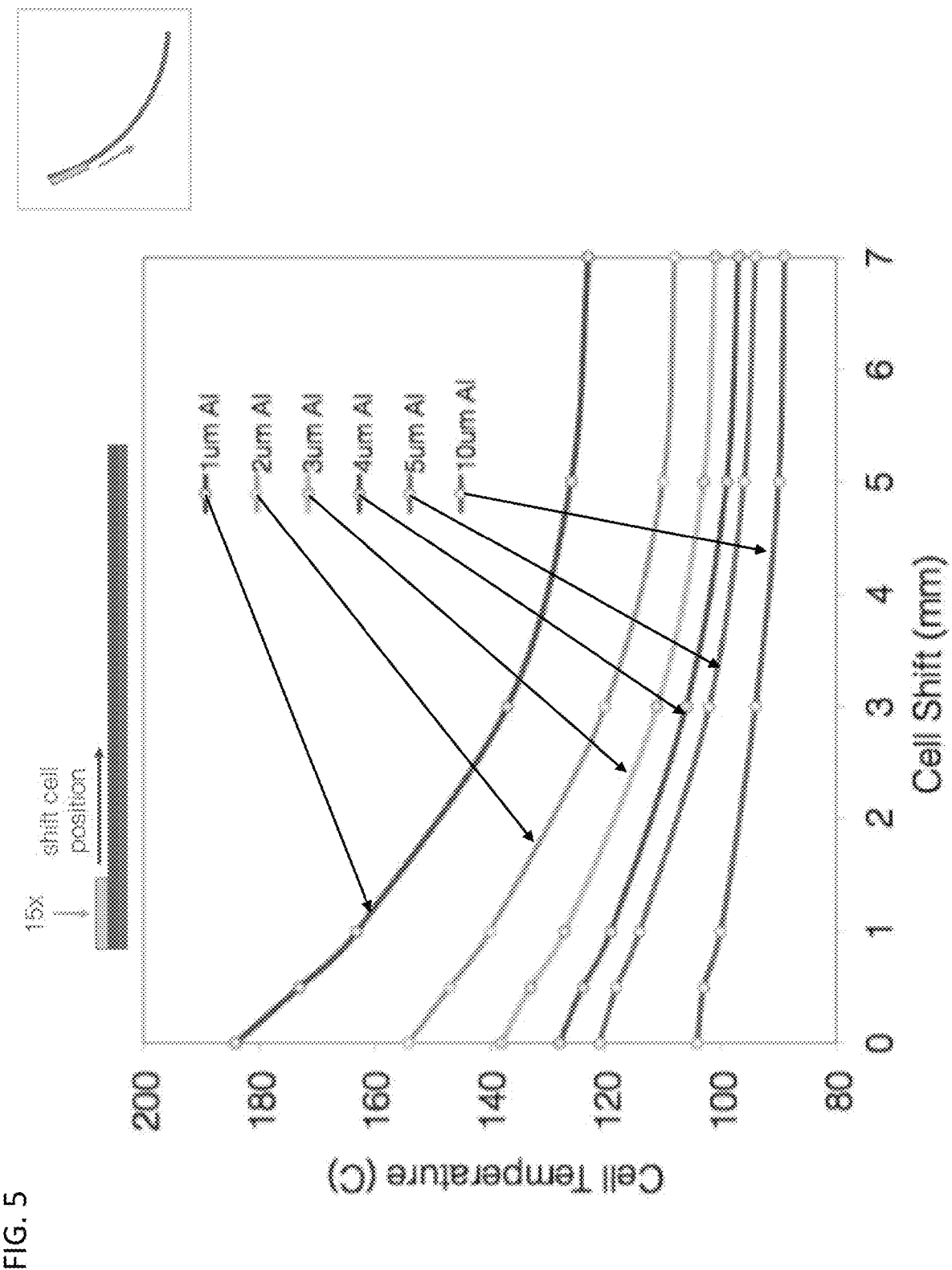
FIG. 5 provides a data graph of the PV cell temperature as a function of cell position on the concentrator with respect to some embodiments of a PV cell having a single cover glass layer.

FIG. 5 provides a chart illustrating how the change in position of the PV cell with a single protective glass layer can reduce the temperature of the cell in a 15× solar concentration scenario. The concentrator make up is that of varying thicknesses of an aluminum reflector material. Accordingly, in various embodiments the thickness of the aluminum reflector material may vary from 1 to 10 µm, and the position of the PV cell relative to the free edge of the collector may vary from 0.5 to 7 mm.

Figure 6:
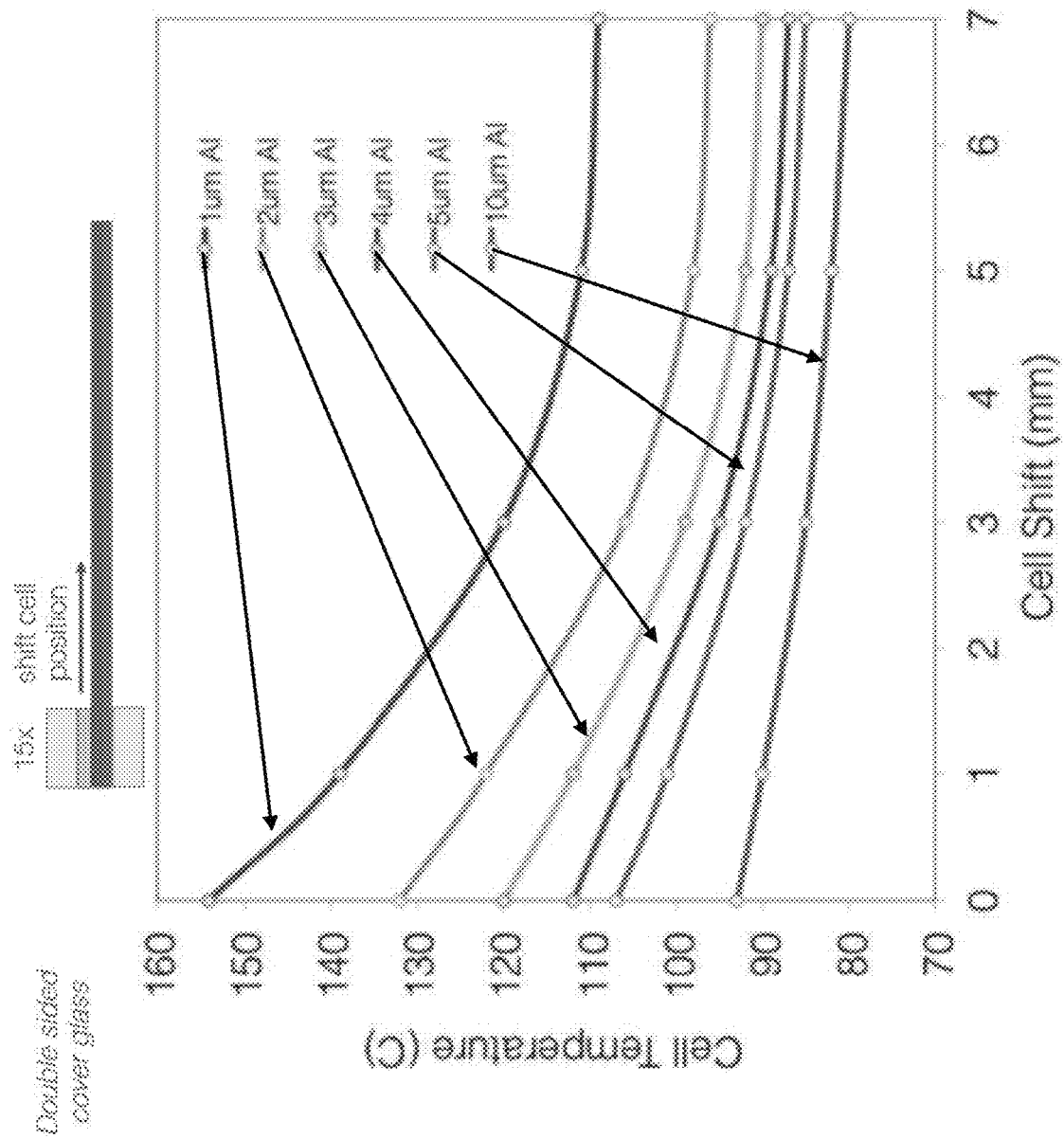
FIG. 6 provides a data graph of the PV cell temperature as a function of cell position on the concentrator with respect to some embodiments of a PV cell having a double sided cover glass layer.
Figure 7:
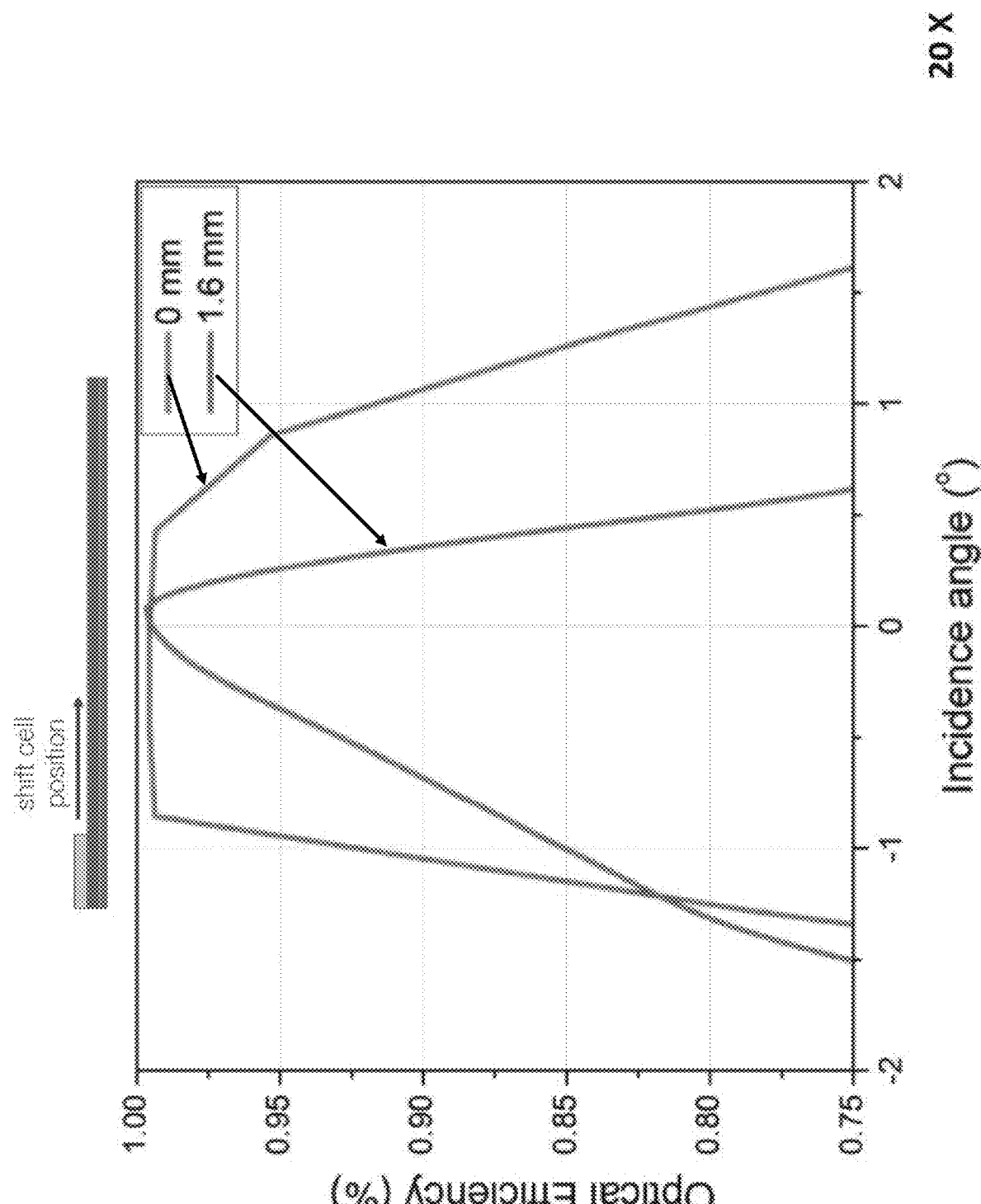
FIG. 7 provides a data graph of the optical efficiency of a power generation array as a function of incidence angle in relation to the position of the PV cell in accordance with some embodiments.

In still other embodiments of the invention a PV cell utilizing a double sided cover glass in conjunction with a shifting PV cell along the solar concentrator may be used to reduce the cell temperature. As demonstrated in FIG. 6, solar concentrators with various thicknesses of aluminum reflector material exhibit a decrease in cell temperature in relation to the shift in cell position. Again, in various embodiments the thickness of the aluminum reflector material may vary from 1 to 10 µm, and the position of the PV cell relative to the free edge of the collector may vary from 0.5 to 7 mm. Additionally, FIG. 7 provides a chart illustrating the relationship between the shifting cell position and the optical efficiency. As shown, in various embodiments the cell may be shifted such that the incidence angle of the solar radiation is from 0 to 1.5 degrees.

Figure 8:
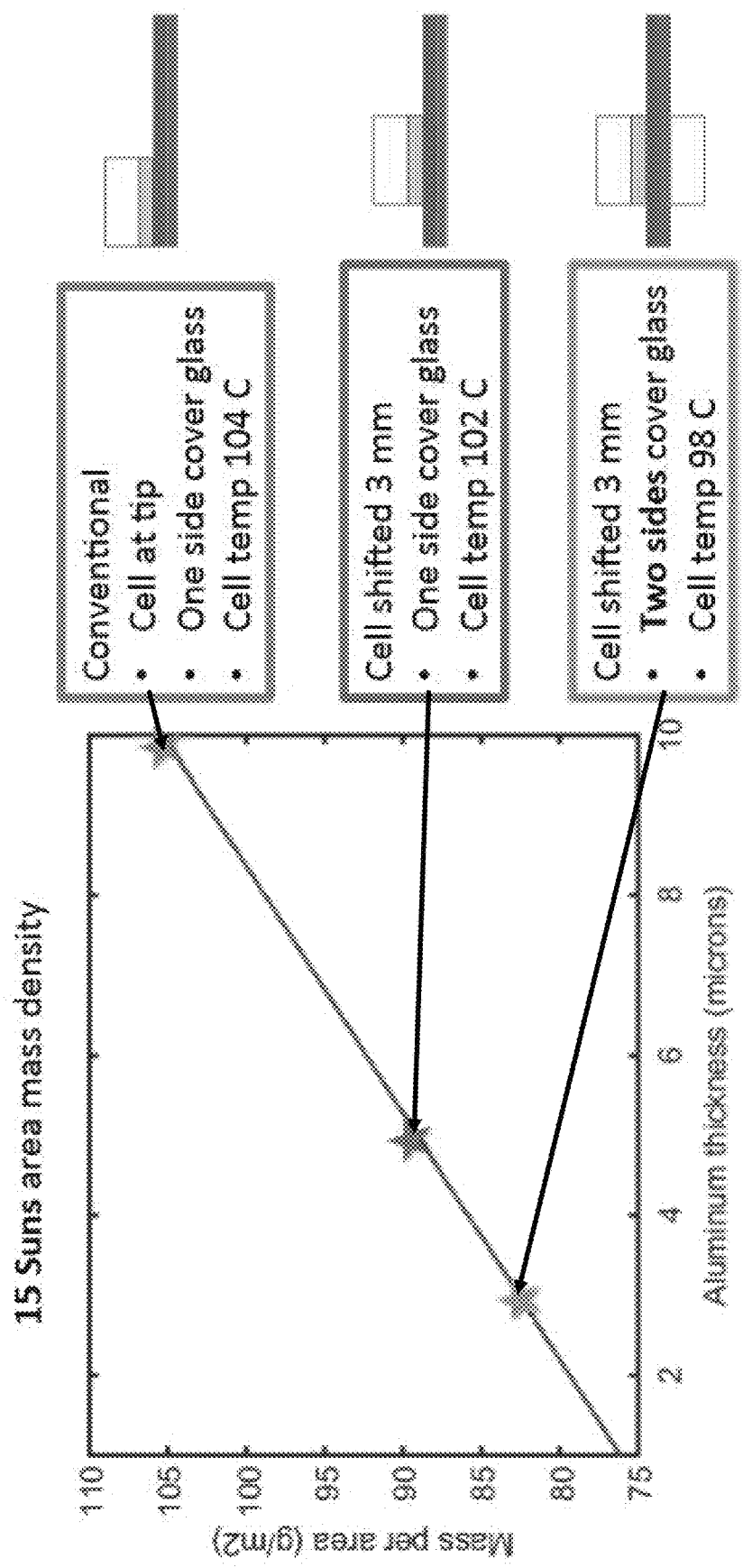
FIG. 8 provides a data graph of the mass per area of a power generation array as a function of aluminum reflector thickness in relation to the position of the PV cell on the concentrator in accordance with some embodiments.

Furthermore, in many embodiments to improve the efficiency of the power generation array, the position of the PV cell may be shifted to reduce the mass per area of the power generation array. As illustrated in the graph in FIG. 8, the mass per area can be significantly decreased along with a decrease in cell temperature when the PV cell is shifted along the back surface of the solar concentrator and utilizes a double sided cover glass embodiment of the PV cell. In various embodiments, for example, a single-sided glass covered PV cell may be disposed at the edge of the concentrator. In other embodiments the cell may be shifted away from the edge of the concentrator from 1 to 6 mm, and in some embodiments 3 mm. In still other embodiments a shifted or unshifted PV cell may be provided with a double-sided glass covering. It should be clear that embodiments of the invention are not confined to the exact configurations as described in the aforementioned figures but rather a general explanation of how to reduce heat and mass in an effort to improve the overall efficiency of the power generation array.

Figure 9A:
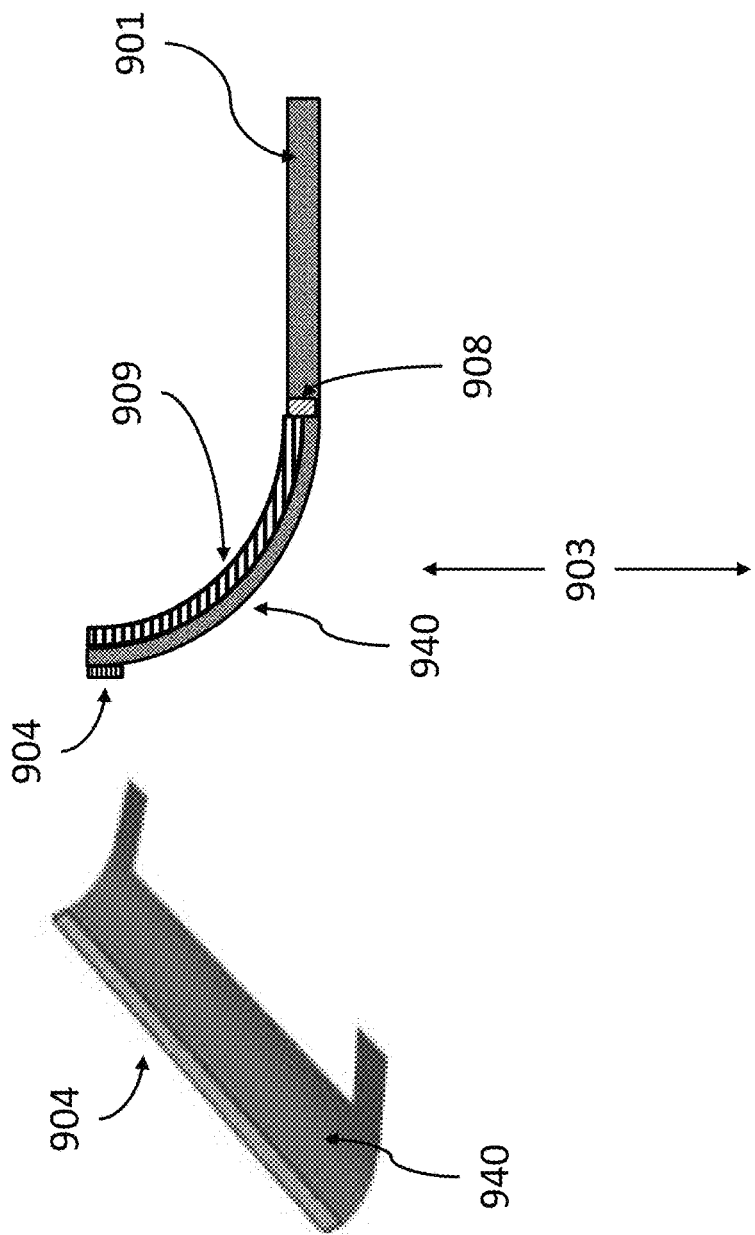
FIG. 9A conceptually illustrates a solar concentrator construction using a single structural substrate in conjunction with a reflective material in accordance with some embodiments.

Solar concentrators may be constructed using any of a variety of materials and techniques in accord with many embodiments of the invention. For example, in several embodiments, solar concentrator configurations are implemented using polyimide films in conjunction with carbon fiber matrix support structures. FIG. 9A illustrates a perspective view as well as cross section of a single solar concentrator that depicts materials that can be used in its construction. In particular, it is illustrated that solar concentrators 903 may comprise a reflective material 909 disposed on a variety of layered materials that may include a KAPTON polyimide layer 920, that is itself utilized in conjunction with a carbon fiber matrix support structure 940. The solar concentrator may be connected to a structural substrate 901 by way of a resilient connector 908. In accord with many other embodiments the structural substrate 901 may be constructed from a carbon fiber matrix. Furthermore, in accord with many embodiments the carbon fiber support matrix in both the solar concentrator 903 and the structural substrate body 901 may comprise at least three layers of carbon fiber.

Figure 9B:
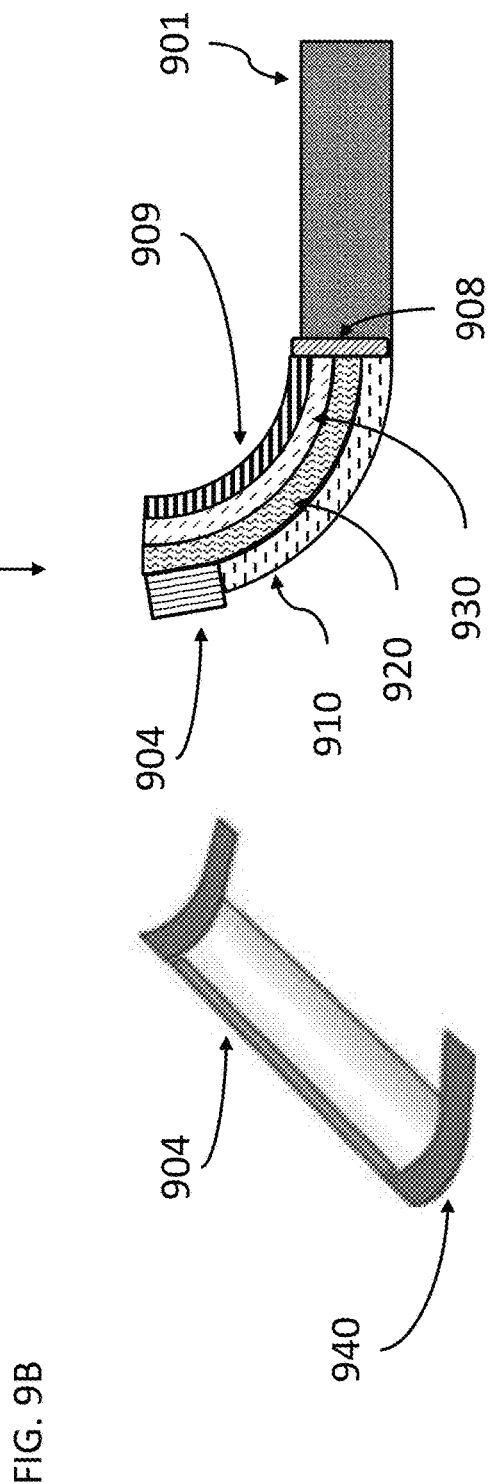
FIG. 9B conceptually illustrates a solar concentrator construction using a composite of a structural support spring in conjunction with a multi-layer parabolic concentrator in accordance with some embodiments.

FIG. 9B illustrates yet another embodiment of the invention wherein the concentrator 903 may comprise a plurality of layers comprising a heat spreader material 930, a radiator material 910, and a Kapton polyimide material that may be formed with a composite matrix structure 940 for attachment of the PV cell 904 and attachment to the structural substrate body 901. Additionally, the multi-layer solar concentrator can be connected to a structural substrate body 901 by way of a resilient connector 908. As can be appreciated, the carbon fiber matrix support 940 in conjunction with the resilient connector 908 can improve structural integrity and aid in articulating the solar concentrator to a deployed configuration. In other embodiments the concentrator 903 can be formed of a full composite parabolic configuration as illustrated in FIG. 9A. Here the carbon fiber matrix support 940 may act as structural support and an additional resilient force for deployment of the solar concentrator 903. Additionally, the carbon fiber matrix support 940 can have a reflective material 909 disposed on the carbon fiber matrix support 940 parabolic surface. In many embodiments, the carbon fiber matrix support and polyimide films have demonstrated sufficient pliability and durability for operation in space. Although, it should again be clear that while certain materials are referenced, any suitable materials can be incorporated in accordance with certain embodiments of the invention. For instance, any of a variety of spring materials can be incorporated, including any of a variety of conductive spring materials, and non-conductive spring materials.

Figure 10:
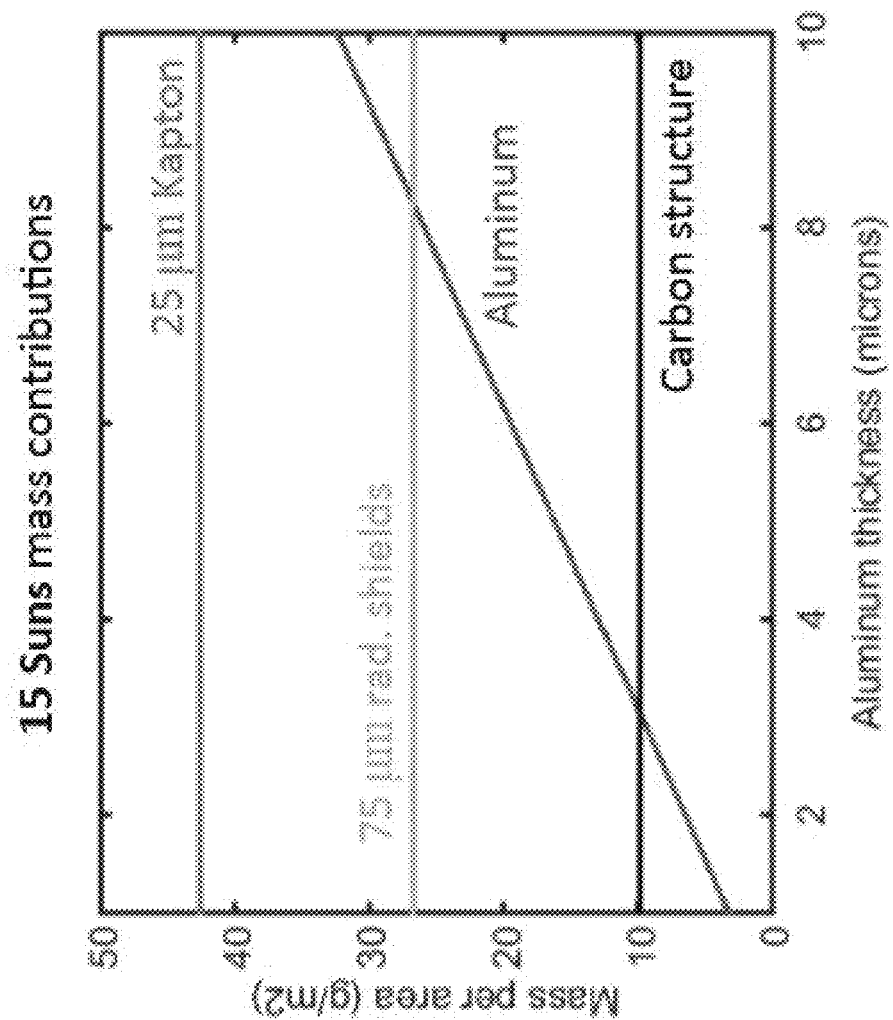
FIG. 10 provides a data graph of the mass per are of a power generation array as a function of structural substrate material and reflector material in accordance with some embodiments.

It can be appreciated that the use of carbon fiber in the construction of the concentrators may aid in the reduction of weight as carbon fiber is less dense than traditional materials. For example the carbon fiber concentrators can be manufactured with a minimum of three plies of carbon fiber to a total thickness of 50 µm. Furthermore, the use of carbon fiber can provide for a lower mass per area ratio with the application of a metallic reflective material. The chart in FIG. 10 illustrates the mass contributions from the various materials used in the construction of PV cells in accordance with embodiments. As shown, carbon fiber exhibits a lower mass per area ratio compared to aluminum and Kapton, and a steep reduction in mass per area is obtained by reducing the thickness of the aluminum layer from 10 to 2 µm.

Figure 11:
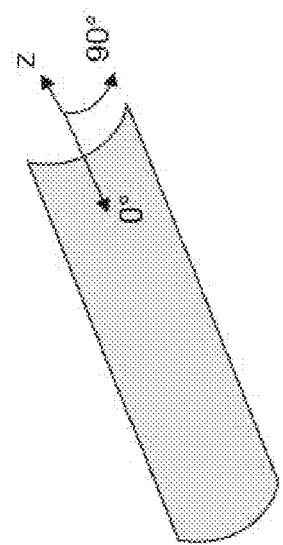
FIG. 11 provides a table of various carbon fiber types for use in a structural configuration of a solar concentrator in accordance with some embodiments.
Figure 12:
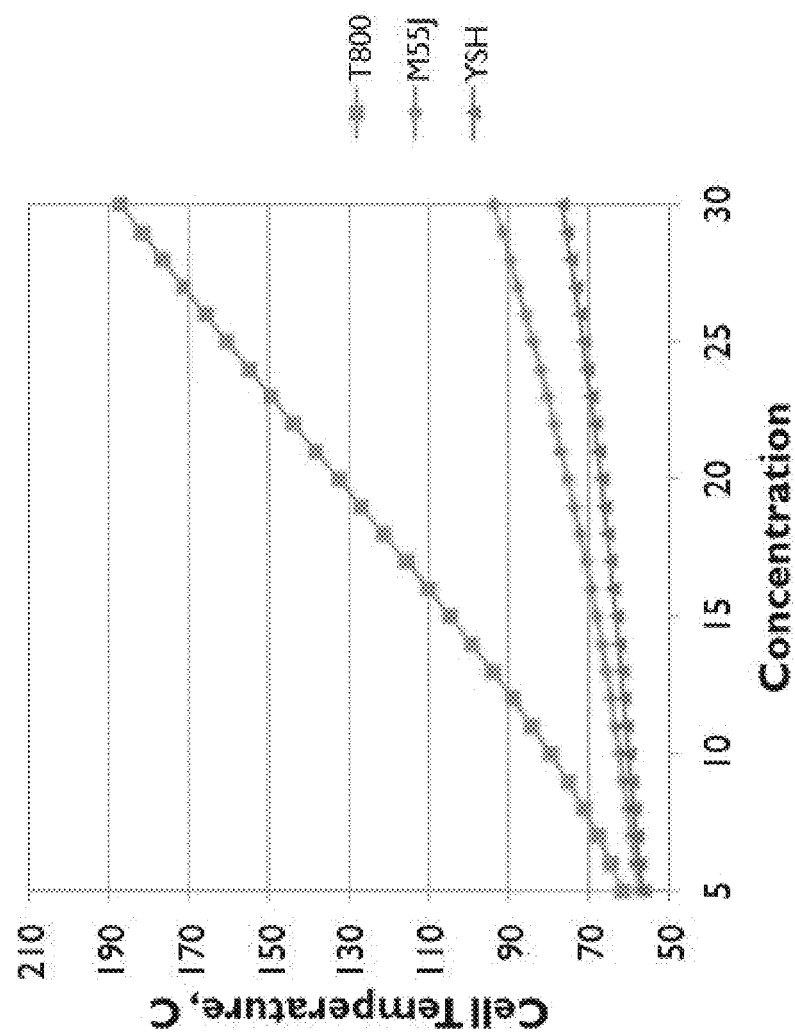
FIG. 12 provides a data graph of the PV cell temperature as a function of carbon fiber type and solar concentration in accordance with some embodiments.

In some embodiments of the invention the carbon fiber matrix can be manufactured using a variety of different carbon fiber. As illustrated in FIG. 11, various types of carbon fiber may be used in various orientations to achieve the desired weight and shape of the staggered-type concentrators, including, for example YsH-70A-60s, MSSSJ and T800H. Furthermore, the various carbon fiber configurations that may be used in some embodiments of the invention will have differing thermal conductivity properties for reducing the PV cell temperature as illustrated by the chart in FIG. 12. For example, a T800 material having a thickness of 17 microns/ply demonstrates a thermal conductance of 18 W/mK, whereas M55J with a thickness of 30 microns/ply demonstrates a thermal conductance of 75 W/mK, and YSH with a thickness of 40 microns/ply demonstrates a thermal conductance of 125 W/mK. Accordingly, in many embodiments a thicker carbon fiber may be used in the construction of the concentrator and/or springs to allow for lower PV cell temperatures at higher solar radiation concentrations.

Figure 13:
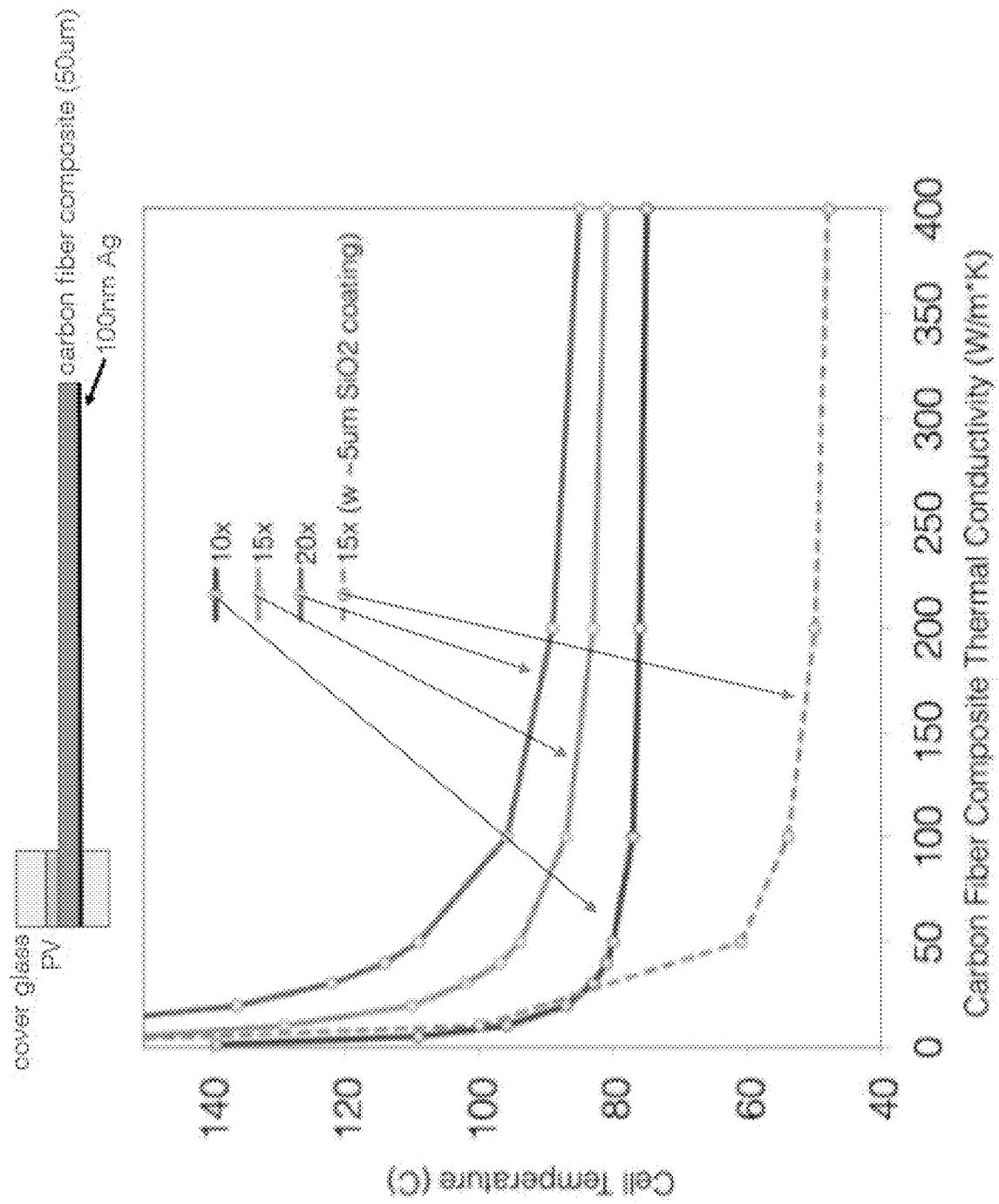
FIG. 13 provides a data graph of the PV cell temperature as a function of carbon fiber composite thermal conductivity and solar concentration in accordance with some embodiments.

It can be further appreciated that the high thermal conductivity of the various carbon fiber configurations can provide more efficient heat dissipation thus allowing the use of thinner metallic reflective layers to be disposed upon the carbon fiber concentrator. The thinner metallic reflective layers can contribute to one of the many goals, including weight reduction, of the power generation array. The chart in FIG. 13 illustrates the PV cell temperature in relation to the thermal conductivity of a carbon fiber concentrator with a 100 nm thick layer of gold reflector material at various solar concentration factors (e.g., 10, 15 and 20). In other embodiments a thermal management layer may be applied to aid in reducing cell temperature and improving thermal conductivity. Accordingly, in many embodiments a carbon fiber material is utilized having a thermal conductivity of from 35 to 400 W/mK. This is further illustrated in FIG. 13 wherein cell temperature decreases greater in embodiments incorporating a 5 µm of $SiO_2$ coating.

Figure 14:
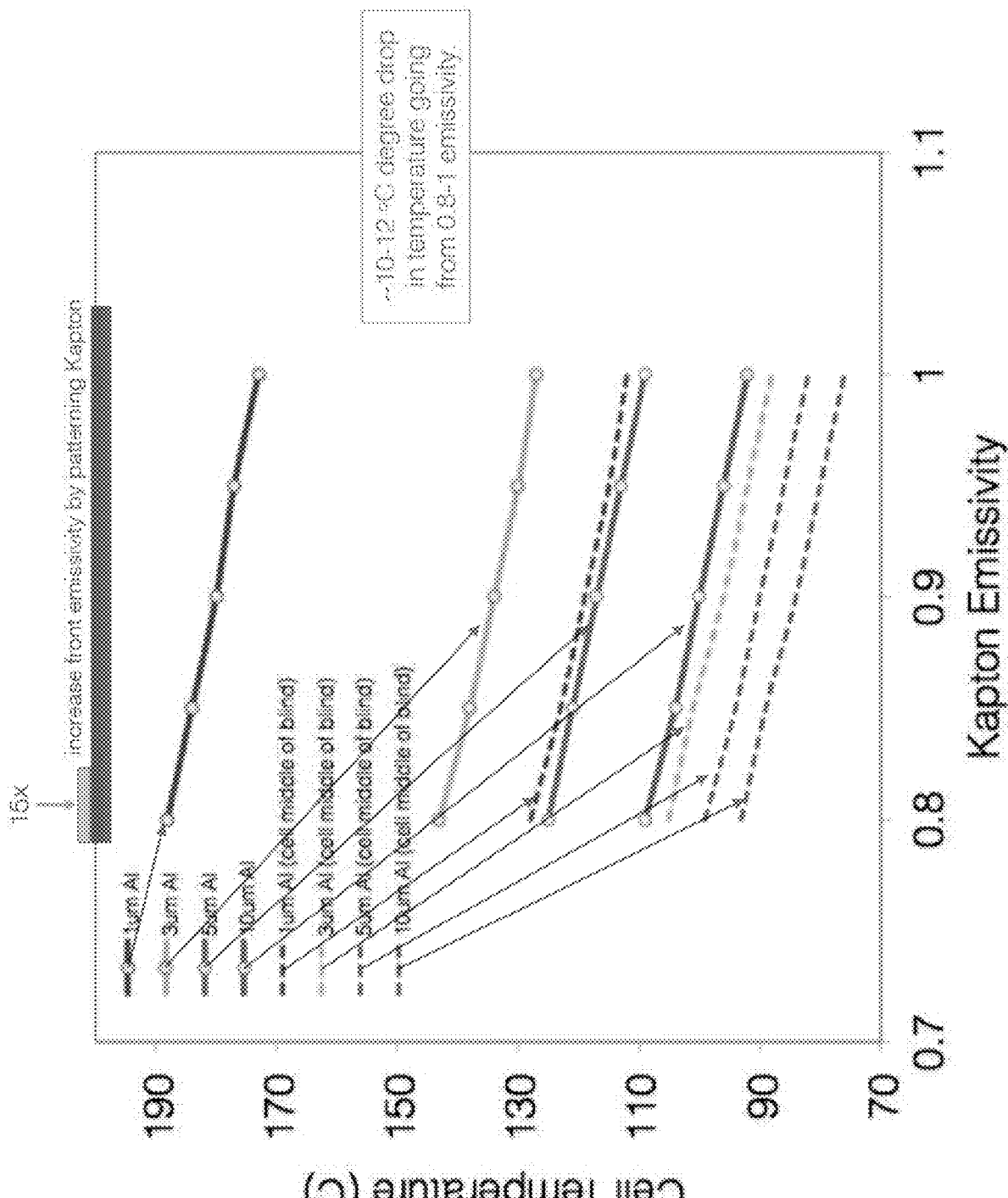
FIG. 14 provides a data graph of the PV cell temperature as a function of Kapton emissivity in conjunction with reflective material thickness and cell position in accordance with some embodiments.

It can further be appreciated that carbon fiber in some embodiments of the invention can have superior properties when compared to the use of only Kapton materials. As illustrated in FIG. 14, Kapton samples were tested with various thicknesses of Aluminum reflective layers; the thinnest of which was ten times thicker than that which was used on the carbon counterparts. Accordingly in many embodiments Kapton may be used having an emissivity of from 0.8 to 1, with an Al coating of from 1 to 10 µm. It can be appreciated that in some embodiments the PV cell can be moved to a different location on the solar concentrator and can produce a much better emissivity value. Accordingly, in various embodiments the PV cell may be positioned away from the free edge of the concentrator from 1 to 10 mm, up to the mid-point of the concentrator. Therefore, in accordance with the many embodiments of the invention it should be understood that the aforementioned figures with respect to the solar concentrator are not limiting as to the only configurations of the concentrator. In accordance with the many embodiments of the invention there are multiple applications for which the many embodiments may be used.

Figure 15:
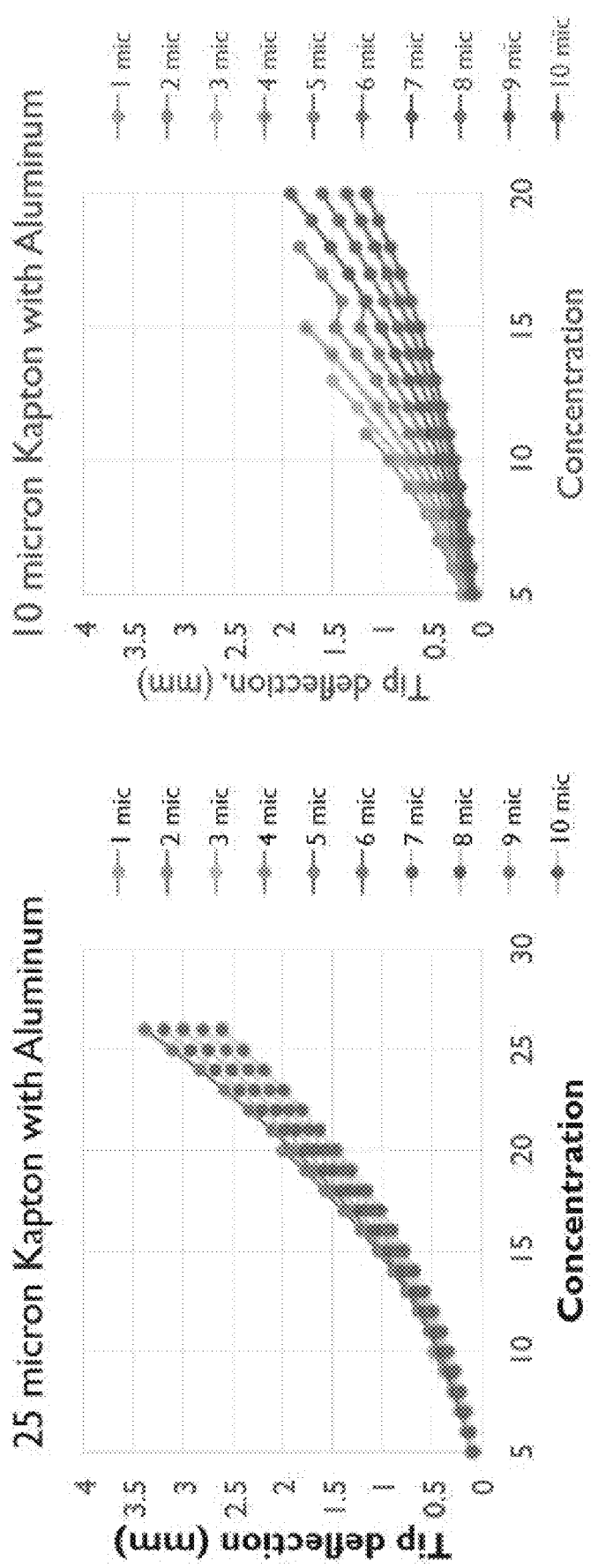
FIG. 15 provides a data graph of the solar concentrator tip deflection as a function of Kapton thickness and solar concentration in accordance with some embodiments.
Figure 16:
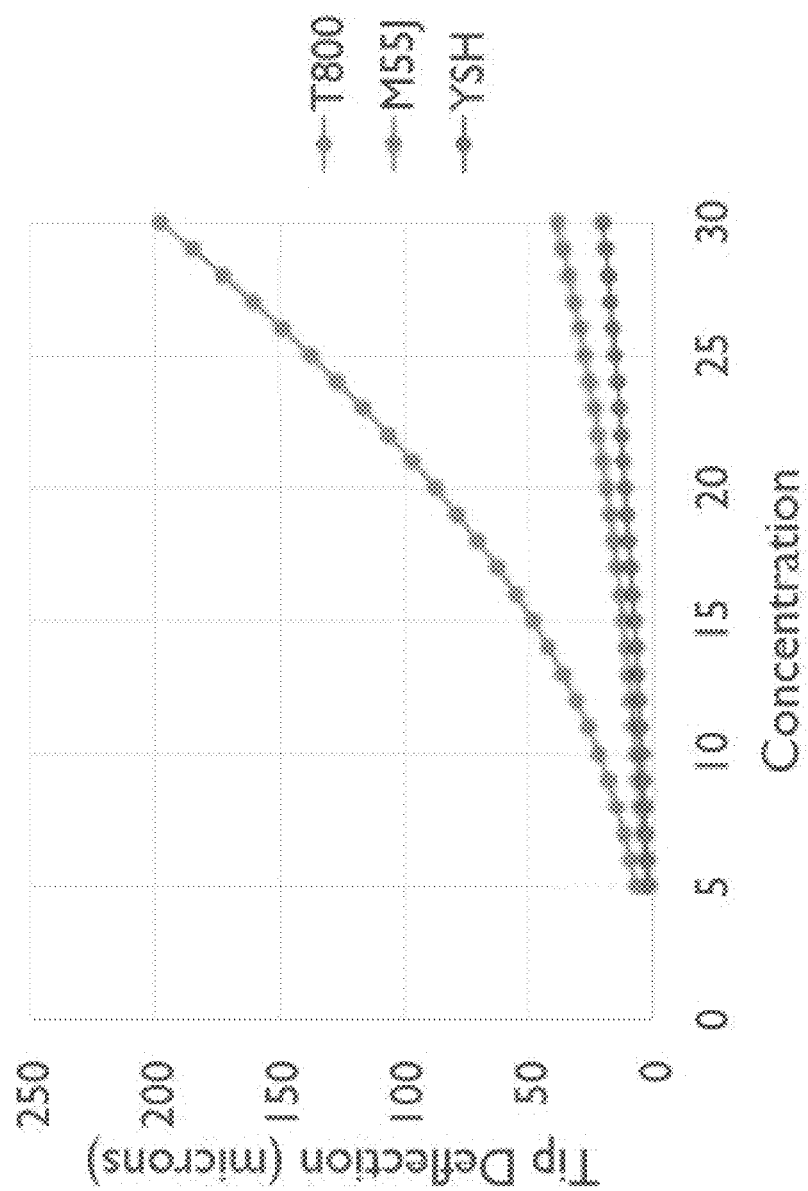
FIG. 16 provides a data graph of the solar concentrator tip deflection as a function of composite type and solar concentration in accordance with some embodiments.
Figure 17:
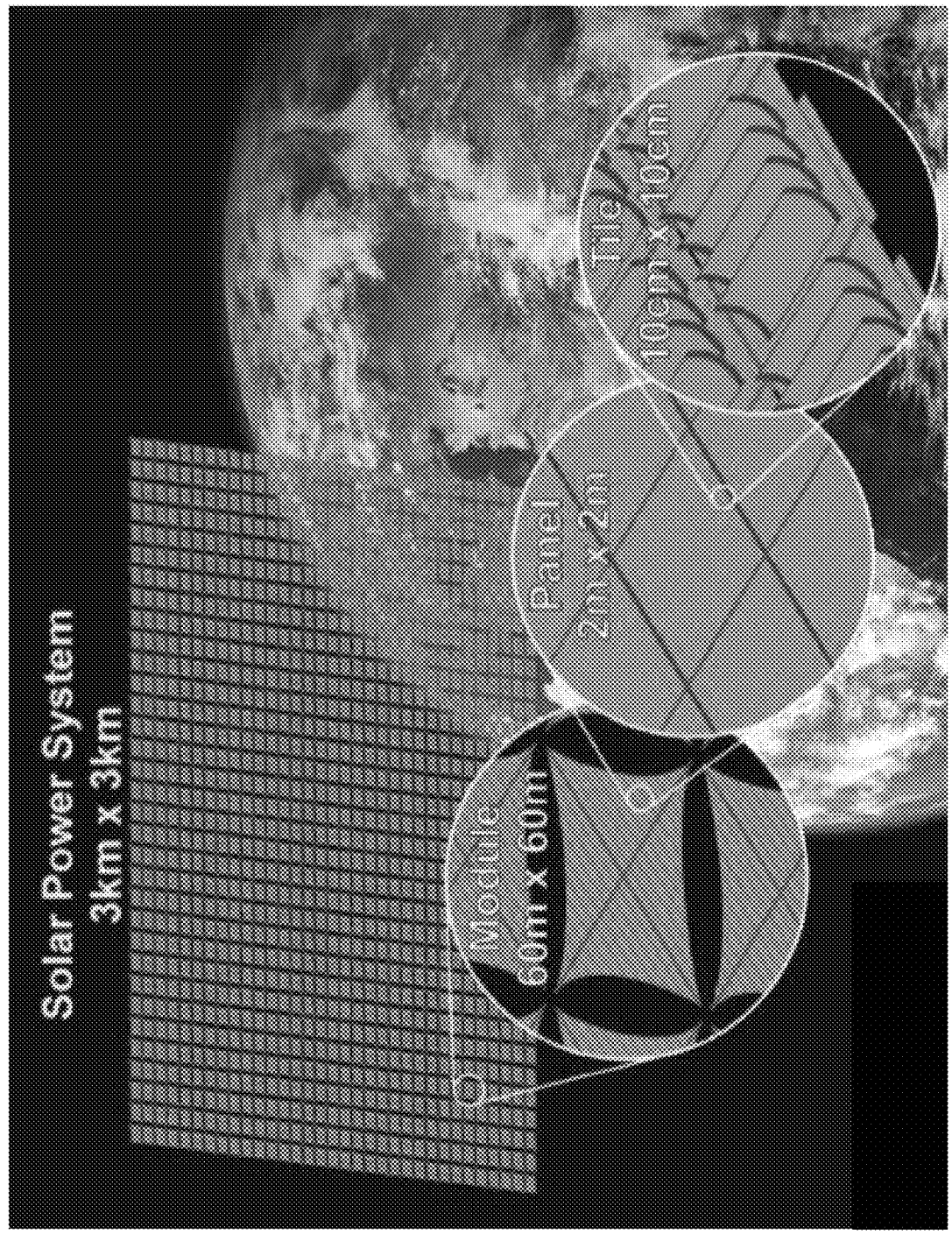
FIG. 17 conceptually illustrates the integration of a compactible power generation array in a generation tile in an overall space-based solar power station system in accordance with some embodiments.

As discussed above one advantage of the use of carbon fiber in many embodiments of the invention is the reduction of differing materials, thus reducing the number of differing coefficients of thermal expansion. As such it can be appreciated that the use of carbon fiber can aid in the reduction of geometrical distortion of the concentrators under operating conditions. Increased differences in materials can lead to greater geometric distortion of the concentrators and reduce the efficiency of the power generation array. As illustrated by the charts in FIGS. 15 and 16 the tip deflection of a carbon fiber solar concentrator in accordance with embodiments can be significantly less than what might be seen with the use of more traditional materials. It should be clear that embodiments of the invention are not confined to the exact configurations as described in the aforementioned figures but rather a general explanation of how to reduce heat and mass in an effort to improve the overall efficiency of the power generation array. For example, 10 to 25 micron Kapton may be coated with 1 to 10 μm of Al to reduce tip deflection. Alternatively, carbon fiber having a ply thickness of from 17 to 40 microns/ply may be utilized in various embodiments As shown in FIG. 17, in accordance with the many embodiments of the invention the power generation array described herein can be implemented in a variety of space based solar power systems. For example, as shown in the illustration, the power generation array can be implemented into a single module or a plurality of modules that are configured to transmit solar energy back to a specified location on Earth or to an extraterrestrial location.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A compactable power generation array comprising:
at least one structural substrate body;
an array of at least two solar concentrators resiliently connected to the at least one structural substrate body, each of the at least two solar concentrators having a plurality of structural support layers, wherein the plurality of structural support layers are layered such that they form a curved body having a front reflector surface and a back surface, and a first edge resiliently connected to the resilient connector and a second edge disposed opposite said first edge;
at least one photovoltaic cell disposed on at least a portion of the back surface of each of the solar concentrators;
at least one power transmitter electromechanically connected to the at least one photovoltaic cell and wherein the at least one power transmitter converts an electrical current generated by the at least one photovoltaic cell into a wireless signal and transmits said wireless signal;
wherein the compactable power generation array is deployable between a deployed position and a compacted positon wherein the at least one power transmitter is separated from the array of at least two solar concentrators by a gap in the deployed position and rests in a separate and parallel plane from that of the array of at least two solar concentrators;
wherein the at least two solar concentrators are deployable between a compacted configuration and a deployed configuration,
wherein in the compacted configuration the first and second edges and the curved body of each of the at least two solar concentrators are positioned parallel to the plane of the at least one structural substrate body,
and wherein in the deployed configuration the second edge and curved body of each of the at least two solar concentrators are positioned out of plane from the plane of the at least one structural substrate body;
wherein the at least two solar concentrators are placed under stress through the application of a holding force when the solar concentrator is disposed in the compacted configuration such that the at least two solar concentrators self-articulate to the deployed configuration upon removal of the holding force; and
wherein when disposed in the deployed configuration, each of the solar concentrators is configured to receive and re-direct solar radiation onto the at least one photovoltaic cell disposed on an adjacent solar concentrator.

2. The power generation array of claim 1 wherein the solar concentrators are configured to maintain a parabolic shape upon self-deployment.

3. The power generation array of claim 1 where the at least one photovoltaic cell is disposed near the second edge of each of the at least two solar concentrators.

4. The power generation array of claim 1 where the at least one photovoltaic cell is disposed upon a middle portion of the back surface of the at least two solar concentrators.

5. The power generation array of claim 1 wherein the at least one photovoltaic cell further comprises at least one cover glass layer.

6. The power generation array of claim 1 wherein the at least one photovoltaic cell further comprises double sided cover glass layers.

7. The power generation array of claim 1 where the at least two solar concentrators further comprise a carbon fiber matrix.

8. The power generation array of claim 7 wherein the carbon fiber matrix comprises at least three carbon fiber layers.

9. The power generation array of claim 1 further comprising a reflective material disposed on the front solar concentrator surface, wherein the reflective material is selected from a group consisting of gold, silver, aluminum, Kapton, and carbon fiber.

10. The power generation array of claim 1 further comprising at least one layer of dielectric material disposed upon each of the at least two solar concentrators.

11. The power generation array of claim 1 wherein the at least two solar concentrators further comprise a plurality of layers comprising:
at least a radiative layer;
a structural film layer disposed upon the radiative layer;
a heat dissipation layer disposed upon the structural film layer; and
a reflective layer disposed upon the heat dissipation layer.

12. The power generation array of claim 11 wherein each of the solar concentrators further comprises a flexible structural support layer that facilitates self-deployment of the solar concentrators when in the deployed configuration.

13. The power generation array of claim 12 wherein the structural support layer comprises a carbon fiber matrix support system.

14. The power generation array of claim 13 wherein the carbon fiber matrix further comprises at least three carbon fiber layers.

15. The power generation array of claim 1 wherein the at least one structural substrate body comprises a carbon fiber matrix.

16. A compactable power generation array comprising:
a first structural substrate body;
a second structural substrate body;
at least one flexible connection member compactably connected to the first and second substrate bodies wherein the first and second structural substrate bodies are deployable between a compacted position and a deployed position,
wherein in the compacted position the first structural substrate body is disposed parallel to the plane of and directly atop the second structural substrate body,
and wherein in the deployed position the first structural substrate body is configured to overlay the second structural substrate body and is separated from the second structural substrate body by a space determined by the configuration of the connection member;
wherein the flexible connection member is placed under stress through a holding force when the first and second structural substrate bodies are disposed in the compacted position such that the first structural substrate body self-articulates to the deployed position upon the removal of the holding force;
an array of at least two solar concentrators resiliently connected to the first structural substrate body, each of the at least two solar concentrators comprising a curved body having a front reflector surface and a back surface, and a first edge resiliently connected to the first structural substrate body and a second edge disposed opposite said first edge;
at least one photovoltaic cell disposed on at least a portion of the back surface of each of the at least two solar concentrators;
wherein the at least two solar concentrators are deployable between a compacted configuration and a deployed configuration,
wherein in the compacted configuration the first and second edges and the curved body of each of the at least two solar concentrators are positioned parallel to the plane of the first and second structural substrate bodies, and
wherein in the deployed configuration the second edge and curved body of each of the at least two solar concentrators are positioned out of plane from the plane of the first structural substrate body;
wherein the at least two concentrators are placed under stress through the application of a holding force when the at least two solar concentrators are disposed in the compacted configuration such that each of the solar concentrators self-articulate to the deployed configuration upon removal of the holding force; and
wherein when disposed in the deployed configuration, each of the solar concentrators is configured to receive and re-direct solar radiation onto the at least one photovoltaic cell disposed on an adjacent solar concentrator.

17. The power generation array of claim 16 wherein the first and the second structural substrate bodies further comprise a carbon fiber matrix.

18. The power generation array of claim 16 wherein the at least one connection member further comprises a carbon fiber matrix.

19. The power generation array of claim 16 wherein the solar concentrators are configured to maintain a parabolic shape upon self-deployment.

20. The power generation array of claim 16 where the at least one photovoltaic cell is disposed near the second edge of the at least two solar concentrators.

21. The power generation array of claim 16 where the at least one photovoltaic cell is disposed upon a middle portion of the at least two solar concentrators.

22. The power generation array of claim 16 wherein the at least one photovoltaic cell further comprises at least one cover glass layer.

23. The power generation array of claim 16 wherein the at least one photovoltaic cell further comprises double sided cover glass layers.

24. The power generation array of claim 16 where the at least two solar concentrators further comprise a carbon fiber matrix.

25. The power generation array of claim 24 wherein the carbon fiber matrix further comprises at least three carbon fiber layers.

26. The power generation array of claim 16 further comprising a reflective material disposed on the front solar concentrator surface, wherein the reflective material is selected from a group consisting of gold, silver, aluminum, Kapton, and carbon fiber.

27. The power generation array of claim 16 further comprising at least one layer of dielectric material disposed upon each of the at least two solar concentrators.

28. The power generation array of claim 16 wherein the at least two solar concentrators further comprise a plurality of layers comprising:
at least a radiative layer;
a structural film layer disposed upon the radiative layer;
a heat dissipation layer disposed upon the structural film layer; and
a reflective layer disposed upon the heat dissipation layer.

29. The power generation array of claim 28 wherein the at least two solar concentrators further comprise a flexible structural support layer that facilitates the self-articulation of the at least two solar concentrators when in the deployed configuration.

30. The power generation array of claim 29 wherein the structural support layer comprises a carbon fiber matrix support system.

31. The power generation array of claim 30 further comprising at least three carbon fiber layers.

32. The power generation array of claim 16 further comprising at least one power transmitter electromechanically connected to each of the at least one photovoltaic cell.

33. The power generation array of claim 32 wherein the at least one power transmitter is disposed on the second structural substrate body.

* * * * *